US011113905B2

(12) United States Patent
Korchev et al.

(10) Patent No.: US 11,113,905 B2
(45) Date of Patent: *Sep. 7, 2021

(54) FAULT DETECTION SYSTEM AND METHOD FOR VEHICLE SYSTEM PROGNOSIS

(71) Applicant: The Boeing Company, Chicago, IL (US)

(72) Inventors: Dmitriy Korchev, Irvine, CA (US); Charles E. Martin, Thousand Oaks, CA (US); Tsai-Ching Lu, Thousand Oaks, CA (US); Steve Slaughter, Scottsdale, AZ (US); Alice A. Murphy, Mesa, AZ (US); Christopher R. Wezdenko, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/776,867

(22) Filed: Jan. 30, 2020

(65) Prior Publication Data

US 2020/0168010 A1    May 28, 2020

Related U.S. Application Data

(63) Continuation of application No. 15/643,638, filed on Jul. 7, 2017, now Pat. No. 10,580,228.

(51) Int. Cl.
*G07C 5/08* (2006.01)
*H04L 29/08* (2006.01)
(Continued)

(52) U.S. Cl.
CPC ........... *G07C 5/0808* (2013.01); *G07C 5/085* (2013.01); *G07C 5/0816* (2013.01); *H04L 67/12* (2013.01); *H04L 69/04* (2013.01); *H04L 69/40* (2013.01)

(58) Field of Classification Search
CPC ............................. G07C 5/0808; H04L 67/12
See application file for complete search history.

(56) References Cited

U.S. PATENT DOCUMENTS 4,166,289 A * 8/1979 Murtha ................. G06F 13/122
710/33
5,274,714 A * 12/1993 Hutcheson ............... G07C 9/25
382/157

(Continued)

FOREIGN PATENT DOCUMENTS

DE    102016122752    10/2016

OTHER PUBLICATIONS

Harris, et al, "Vector Radix Fast Fourier Transform", 1977 IEEE Int. Conf. on Acoustics, Speech and Signal Processing, May 9-11, 1977, Hartford, Conn., Massachusetts Institute of Technology Research Laboratory of Electronics.

(Continued)

*Primary Examiner* — Jean Paul Cass
(74) *Attorney, Agent, or Firm* — Perman & Green, LLP

(57) ABSTRACT

A fault detection system including one or more sensors onboard a vehicle to detect a characteristic of the vehicle and generate sensor signals corresponding to the characteristic, a processor onboard the vehicle to receive the sensor signals, generate one or more fast Fourier transform vectors based on the sensor signals so that the one or more fast Fourier transform vectors are representative of the characteristic, generate an analysis model from a time history of the fast Fourier transform vectors, and determine, using the analysis model, a degree to which the one or more fast Fourier transform vectors could have been generated by the analysis model, and an indicator to communicate an operational status of the vehicle to an operator or crew member of the vehicle based on the degree to which the one or more fast (Continued)

Fourier transform vectors could have been generated by the analysis model.

20 Claims, 11 Drawing Sheets

(51) Int. Cl.
*H04L 29/06* (2006.01)
*H04L 29/14* (2006.01)

(56) References Cited

U.S. PATENT DOCUMENTS

| | | | | |
|---|---|---|---|---|
| 5,715,372 A * | 2/1998 | Meyers | G10L 15/02 | 706/16 |
| 8,296,107 B2 * | 10/2012 | Turner | G05B 17/02 | 703/2 |
| 8,718,672 B2 * | 5/2014 | Xie | H04W 4/029 | 455/456.1 |
| 9,558,601 B2 | 1/2017 | Lu et al. | | |
| 9,916,538 B2 * | 3/2018 | Zadeh | G06K 9/627 | |
| 10,209,314 B2 * | 2/2019 | Garcia | G06N 20/00 | |
| 2004/0088272 A1 * | 5/2004 | Jojic | G06K 9/6255 | 706/13 |
| 2008/0284575 A1 * | 11/2008 | Breed | H01H 35/146 | 340/438 |
| 2010/0052945 A1 * | 3/2010 | Breed | G08G 1/096783 | 340/903 |
| 2011/0307196 A1 * | 12/2011 | Schumacher | G01R 31/52 | 702/58 |
| 2014/0200952 A1 * | 7/2014 | Hampapur | G06Q 10/06 | 705/7.28 |
| 2015/0178631 A1 * | 6/2015 | Thomas | G06K 9/6255 | 706/12 |
| 2015/0304772 A1 * | 10/2015 | Risberg | H04R 3/007 | 381/55 |
| 2016/0350194 A1 * | 12/2016 | Mohan | G06N 20/00 | |
| 2016/0361041 A1 * | 12/2016 | Barsimantov | G16H 50/30 | |
| 2017/0110106 A1 * | 4/2017 | Kumar | H04R 29/00 | |
| 2018/0136899 A1 * | 5/2018 | Risberg | H04R 3/04 | |
| 2018/0292826 A1 * | 10/2018 | DeFelice | G08G 5/0091 | |
| 2018/0314250 A1 * | 11/2018 | Lewis | G06N 3/0454 | |
| 2019/0041845 A1 * | 2/2019 | Cella | G01M 13/028 | |
| 2019/0087247 A1 * | 3/2019 | Chakraborty | H04L 67/02 | |
| 2019/0171187 A1 * | 6/2019 | Cella | G05B 23/0221 | |

OTHER PUBLICATIONS

Martin, et al. Vehicle System Prognosis Device and Method, U.S. Appl. No. 15/377,532, filed Dec. 13, 2016.

Sharma, et al. "Sensor Faults: Detection Methods and Prevalence in Real-World Datasets", ACM Transactions on Sensor Networks, vol. 6, Issue 3, Jun. 2010, Article 23.

Ramanathan, et al. "Rapid Deployment with Confidence: Calibration and Fault Detection in Environmental Sensor Networks". Technical Reports, Center for Embedded Network Sensing, University of California, Jan. 2006.

Ramanathan, et al. "The Final Frontier: Embedding Networked Sensors in the Soil". Technical Reports, Center for Embedded Network Sensing, University of California, Jan. 2006.

Saybani, et al. "Anomaly Detection and Prediction of Sensors Faults in a Refinery Using Data Mining Techniques and Fuzzy Logic", Scientific Research Essays, vol. 6, Issue 27, Nov. 2011, pp. 5685-5695.

Subramaniam, et al. "Outllline Outlier Detection in Sensor Data Using Non-Parametric Models", VLDB '06 Proceedings of the 32nd international conference on Very large data bases, Sep. 2006, pp. 187-198.

Mairal, et al. "Online Learning for Matrix Factorization and Sparse Coding", Journal of Machine Learning Research, vol. 11, 2010, pp. 19-60.

Blei, David M. "Bayesian Mixture Models and the Gibbs Sampler" Columbia University, Oct. 2015.

Kailath, Thomas. "Linear Least-Squares Estimation" Benchmark Papers in Electrical Engineering and Computer Science / 17; A Benchmark Book Series; vol. 18 Dowden, Hutchinson & Ross, Inc. 1977.

* cited by examiner

FAULT DETECTION SYSTEM AND METHOD FOR VEHICLE SYSTEM PROGNOSIS

CROSS-REFERENCE TO RELATED APPLICATIONS

This application is a continuation of U.S. patent application Ser. No. 15/643,638 filed on Jul. 7, 2017 (now U.S. Pat. No. 10,580,228 issued on Mar. 3, 2020), the disclosure of which is incorporated herein by reference in its entirety.

This invention was made with Government support under Agreement No. W911W6-15-2-0001 for the Autonomous Sustainment Technologies for Rotorcraft Operations-Electrical (ASTRO-E) Program. The Government has certain rights in this invention.

BACKGROUND

Generally conventional vehicle system prognosis is performed using knowledge-driven methods, estimation methods, time-series analysis based methods, and machine learning base methods. These methods are applied to sensor data values obtained from one or more sensors onboard, for example, a vehicle. The knowledge-driven methods, for example, rely on domain knowledge in order to place rules and/or constraints on the sensor data values. The knowledge-driven methods may generally detect more subtle faults in systems of the vehicle than the estimation methods, time-series analysis based methods, and machine learning base methods. However, because the knowledge-driven methods are not data-driven, the knowledge-driven methods are generally less robust (e.g., exhibit a greater number of false negatives) than the estimation methods, time-series analysis based methods, and machine learning base methods.

The estimation methods generally utilize the sensor data from unique, but correlated sensors in order to detect system faults. While the estimation methods do not necessarily require completely redundant sensors, the estimation methods do require that a significantly strong correlation exist between two different sensors at the very least and that the fault does not exist far enough downstream from the sensors such that the sets of recorded measurements from both sensors are affected.

Time-series analysis based methods generally make use of temporal correlations among current and past measurements from a single sensor in order to predict future measurements. The time-series analysis based methods are generally more robust than pure knowledge-driven methods because the time-series analysis based methods can capture unknown system failure signatures in their learned parameters; however, time-series analysis based methods are generally less robust than machine learning approaches due to their reliance on a fixed, pre-defined model.

Machine learning based approaches generally infer a model of normal versus abnormal sensor measurements using training data, and then statistically detect and identify classes of faults. The machine learning based approaches are generally the most robust of the aforementioned vehicle system prognosis methods because the machine learning based approaches are purely data-driven. However, machine learning based approaches also require the most data to train and tend to be less capable of detecting failures that induce subtle changes in the sensor signals.

SUMMARY

Accordingly, a system and method, intended to address one or more of the above-identified (or other) concerns, would find utility.

One example of the present disclosure relates to a fault detection system comprising: one or more sensors onboard a vehicle, the one or more sensors being configured to detect a predetermined characteristic of the vehicle and generate a plurality of sensor signals corresponding to the predetermined characteristic; and a processor onboard the vehicle and in communication with the one or more sensors, the processor being configured to generate an analysis model for the predetermined characteristic, the analysis model being trained by the processor with a training data set of fast Fourier transform ("FFT") vectors that are generated from the plurality of sensor signals obtained under normal operating conditions of the predetermined characteristic, and determine a health of a vehicle component corresponding to the predetermined characteristic with the analysis model.

Another example of the present disclosure relates to a non-transitory computer readable medium storing computer readable instructions that when executed by a computer cause the computer to perform a method comprising: obtaining, with a processor onboard a vehicle, a plurality of sensor signals corresponding to a predetermined characteristic of the vehicle from one or more sensors onboard the vehicle; generating, with the processor, an analysis model for the predetermined characteristic, the analysis model being trained by the processor with a training data set of fast Fourier transform vectors that are generated from the plurality of sensor signals obtained under normal operating conditions of the predetermined characteristic; and determining, with the processor, a health of a vehicle component corresponding to the predetermined characteristic with the analysis model.

Yet another example of the present disclosure relates to a method comprising: obtaining, with a processor onboard a vehicle, a plurality of sensor signals corresponding to a predetermined characteristic of the vehicle from one or more sensors onboard the vehicle; generating, with the processor, an analysis model for the predetermined characteristic, the analysis model being trained by the processor with a training data set of fast Fourier transform vectors that are generated from the plurality of sensor signals obtained under normal operating conditions of the predetermined characteristic; and determining, with the processor, a health of a vehicle component corresponding to the predetermined characteristic with the analysis model.

One example of the present disclosure relates to a fault detection system comprising: one or more sensors onboard a vehicle, the one or more sensors being configured to detect a predetermined characteristic of the vehicle and generate a plurality of sensor signals corresponding to the predetermined characteristic; a processor onboard the vehicle, the processor being configured to receive the plurality of sensor signals from the one or more sensors, generate one or more fast Fourier transform vectors based on the plurality of sensor signals so that the one or more fast Fourier transform vectors are representative of the predetermined characteristic, generate an analysis model from a time history of the fast Fourier transform vectors, and determine, using the analysis model, a degree to which the one or more fast Fourier transform vectors could have been generated by the analysis model; and an indicator in communication with the processor, the indicator being configured to communicate an operational status of the vehicle to an operator or crew member of the vehicle based on the degree to which the one or more fast Fourier transform vectors could have been generated by the analysis model.

BRIEF DESCRIPTION OF THE DRAWINGS

Figure 1A:
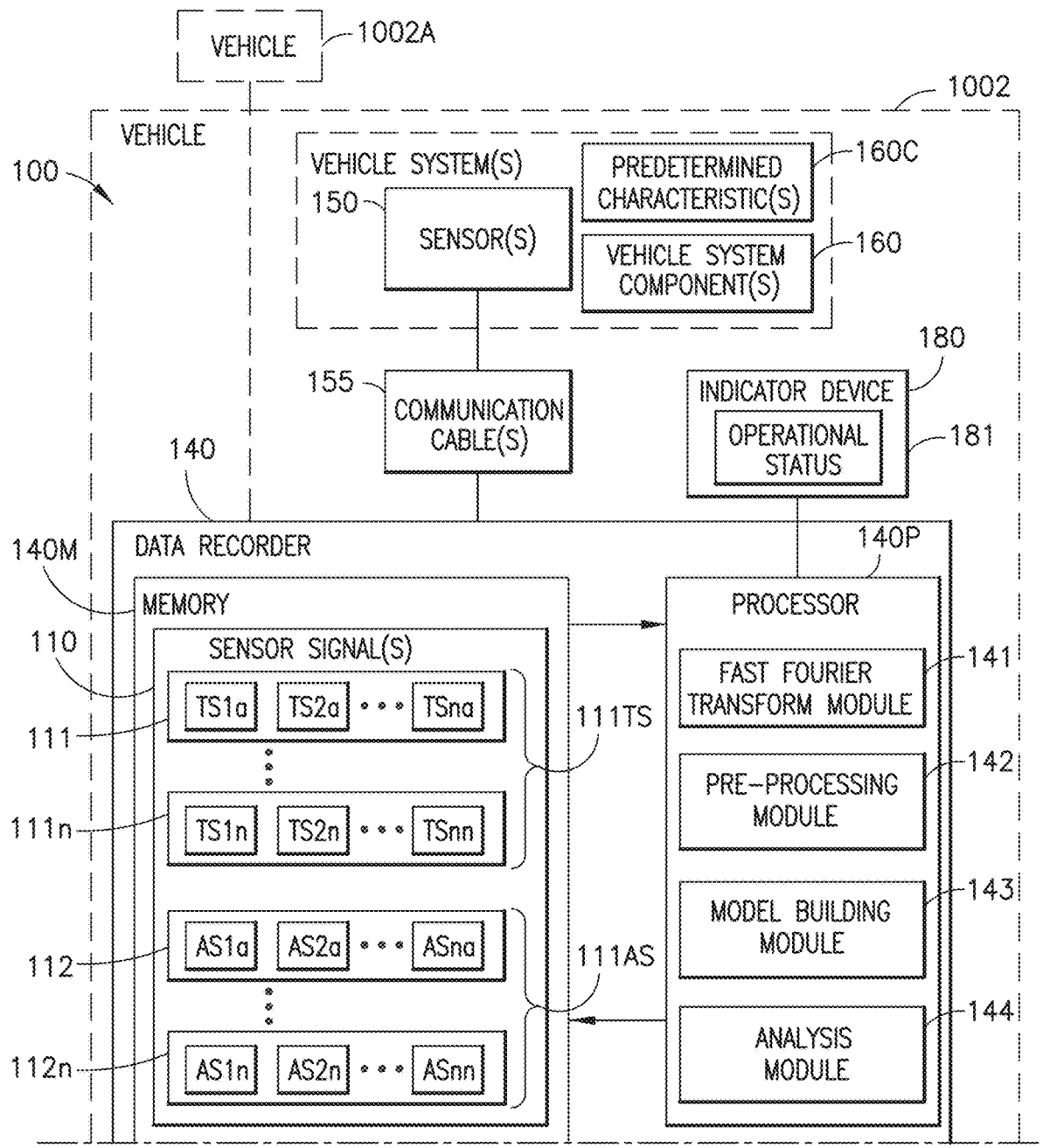
Figures 1, 1A, 1B:
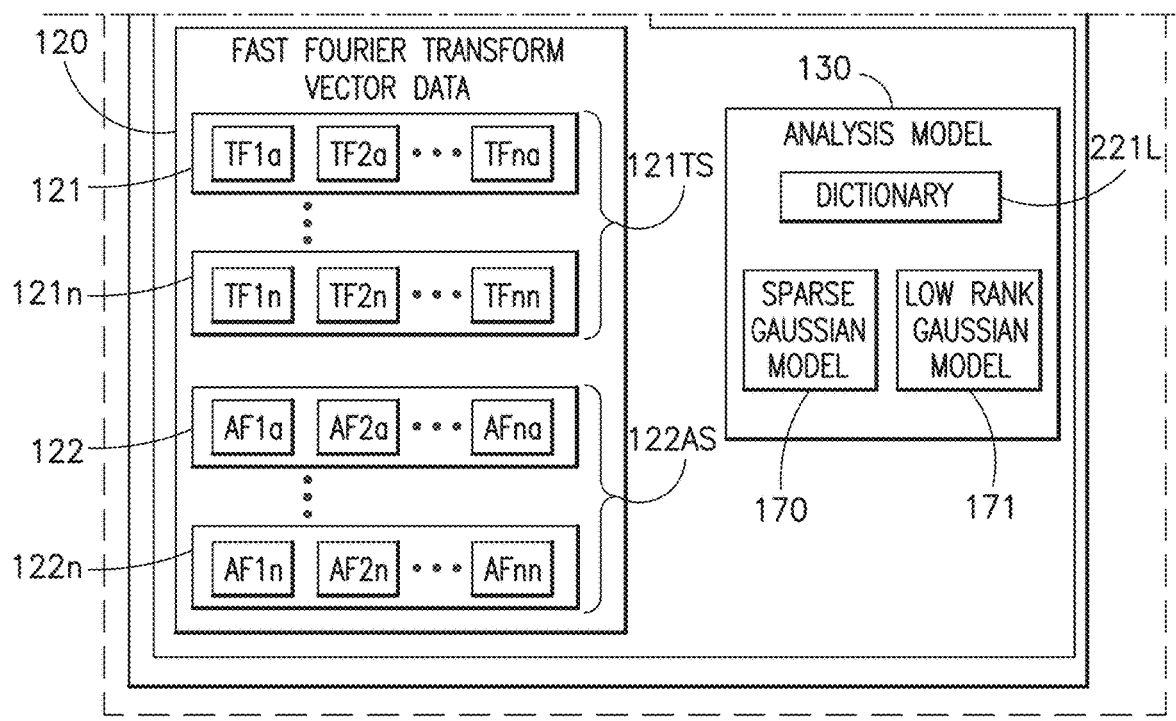
Figure 2:
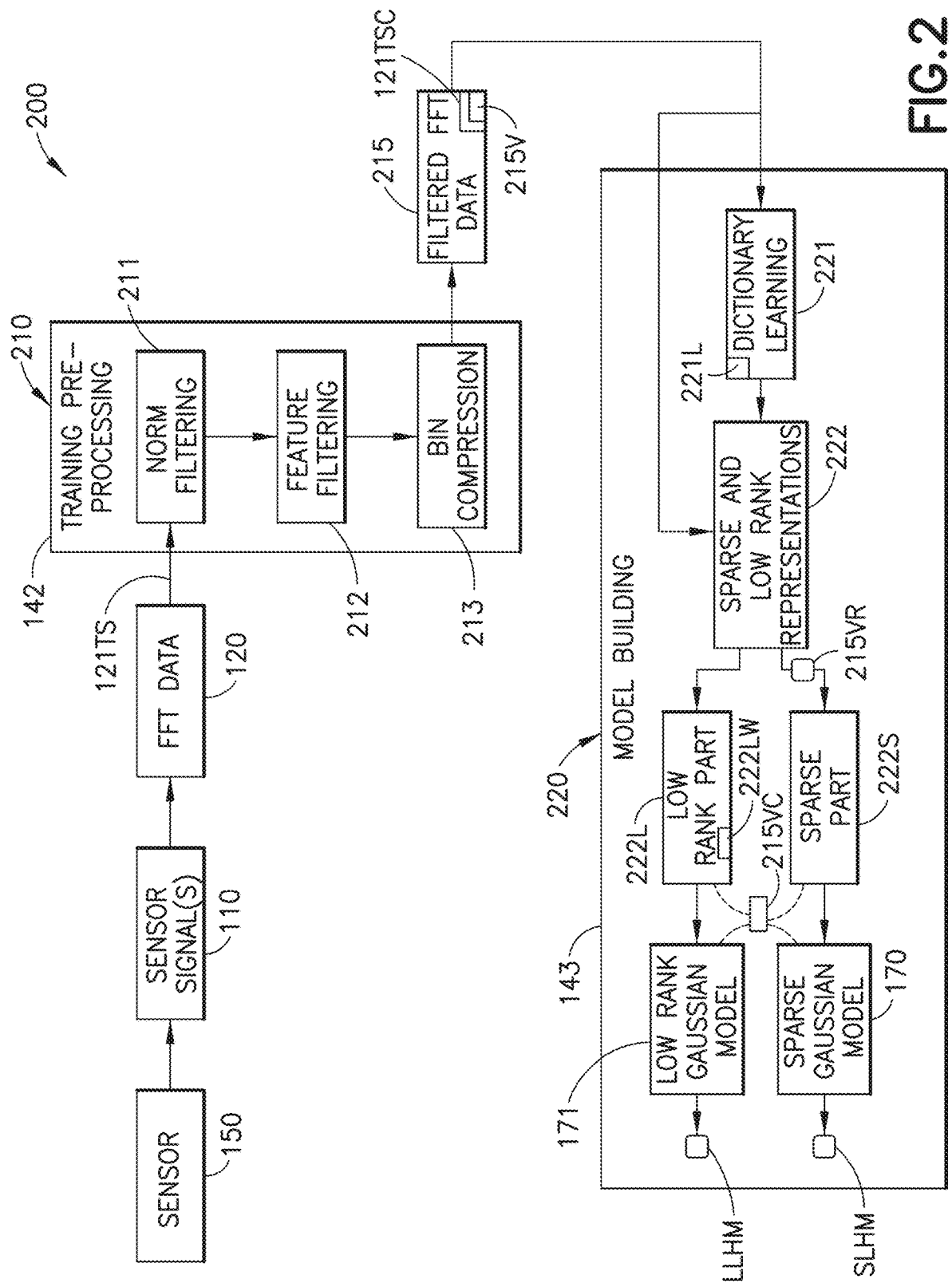
Figure 3:
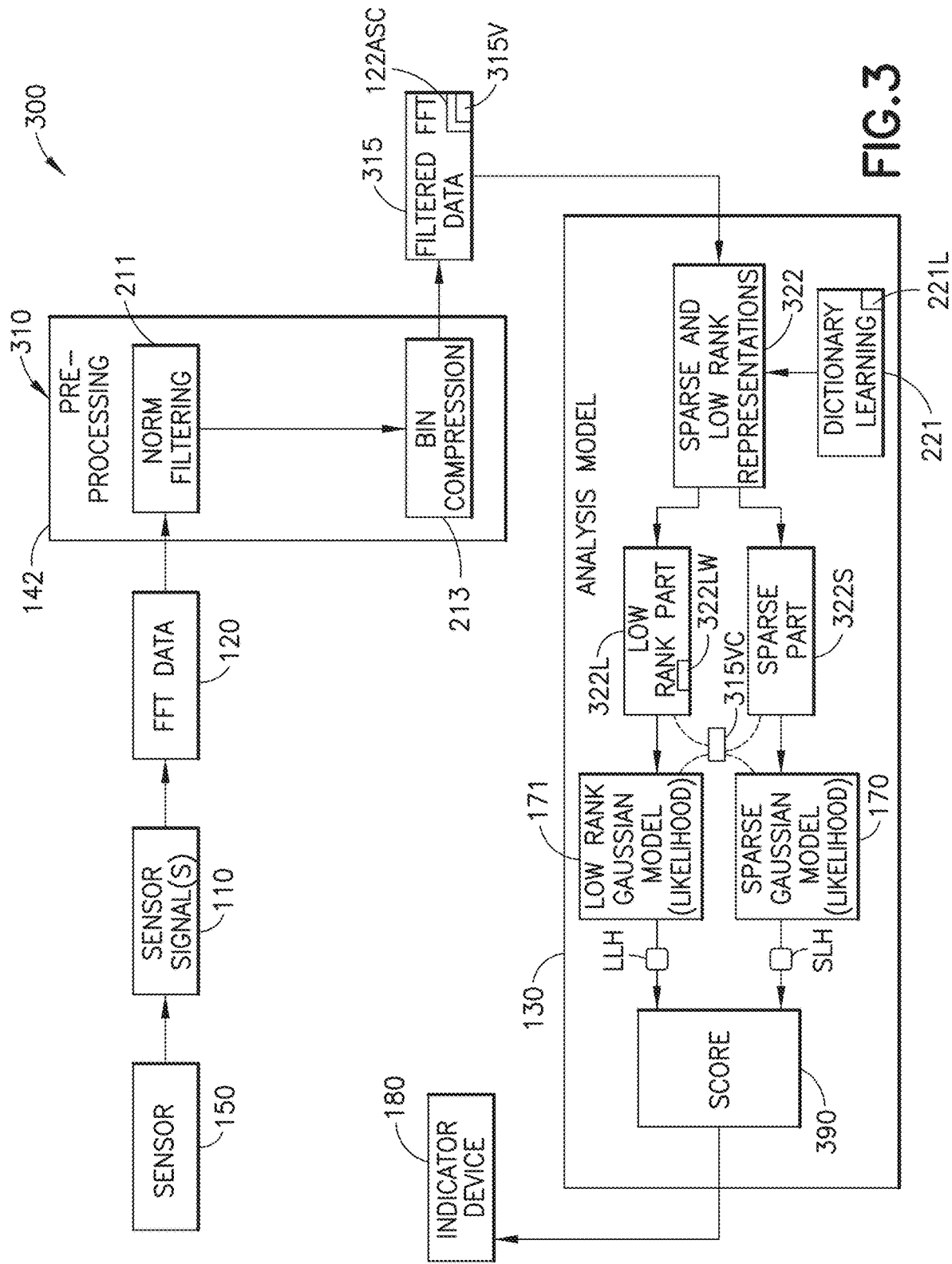
Figure 4:
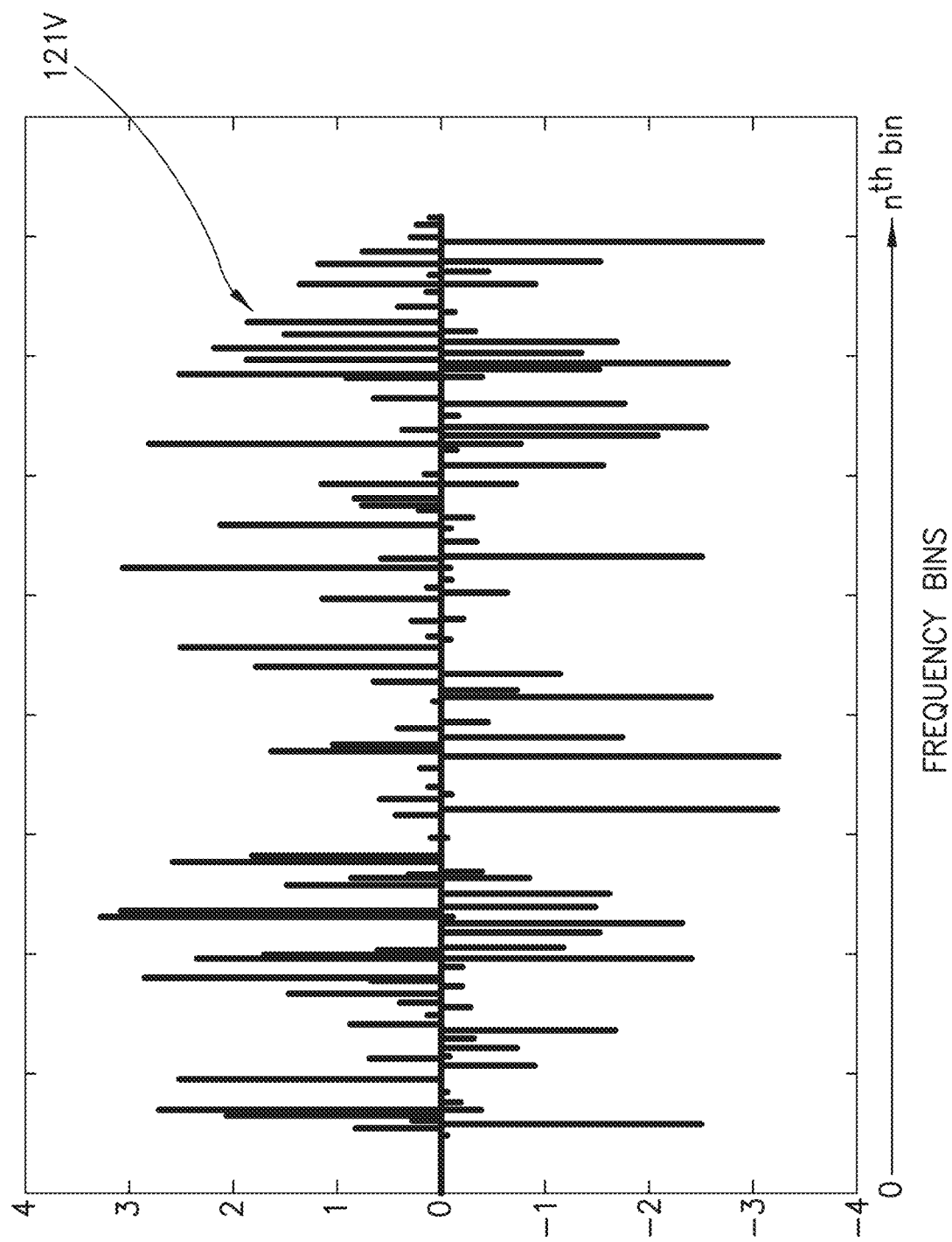
Figure 5:
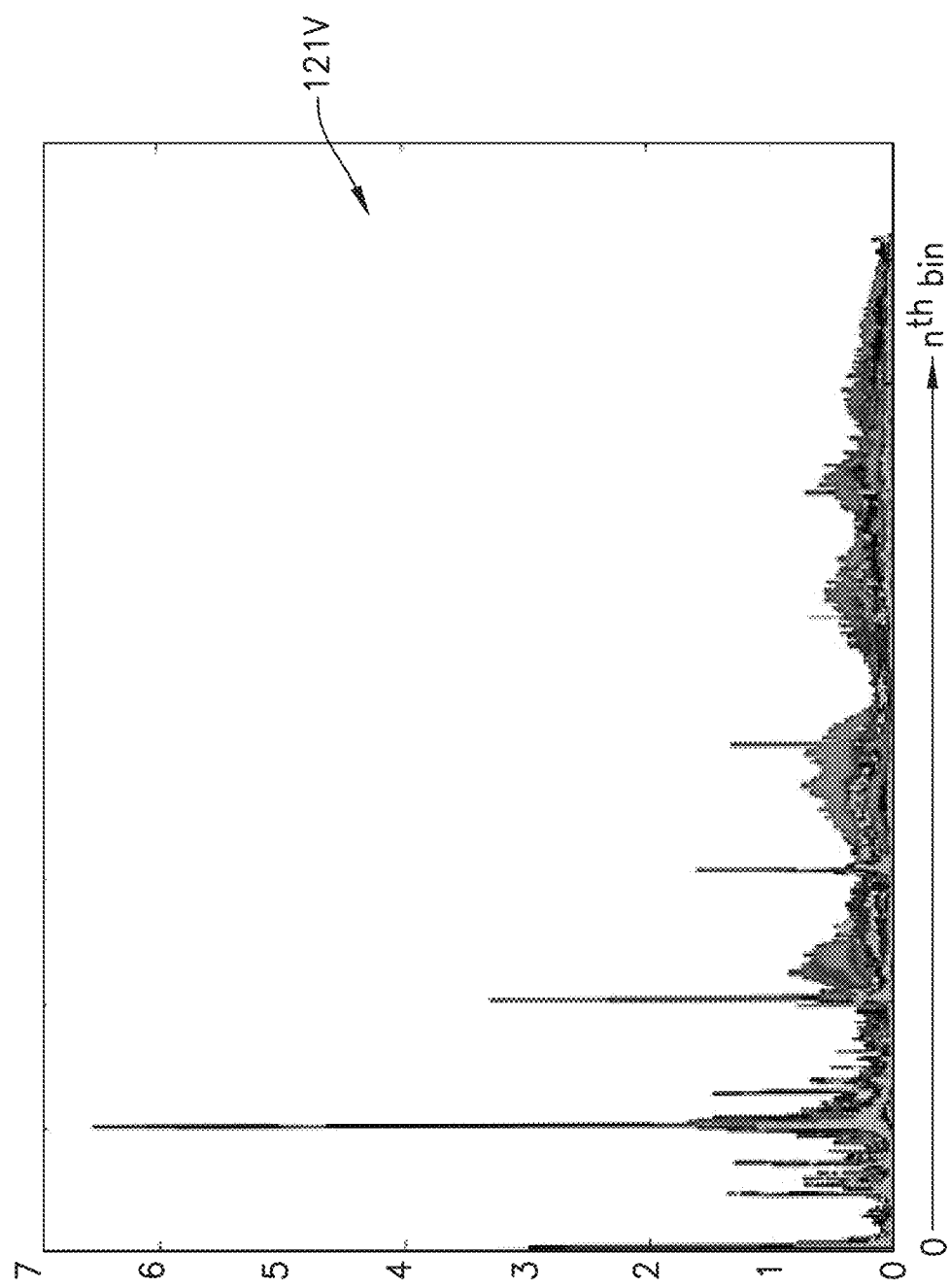
Figure 6:
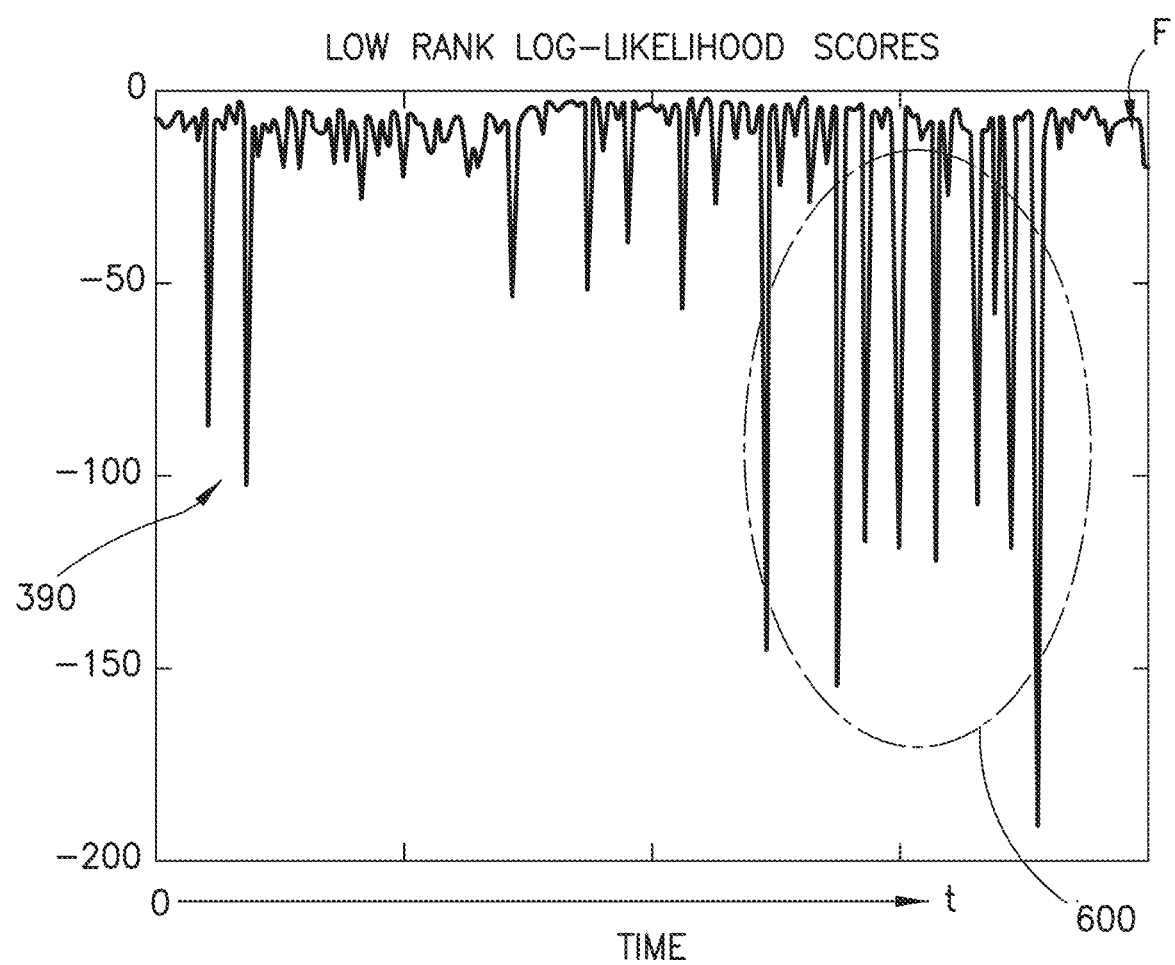
Figure 7:
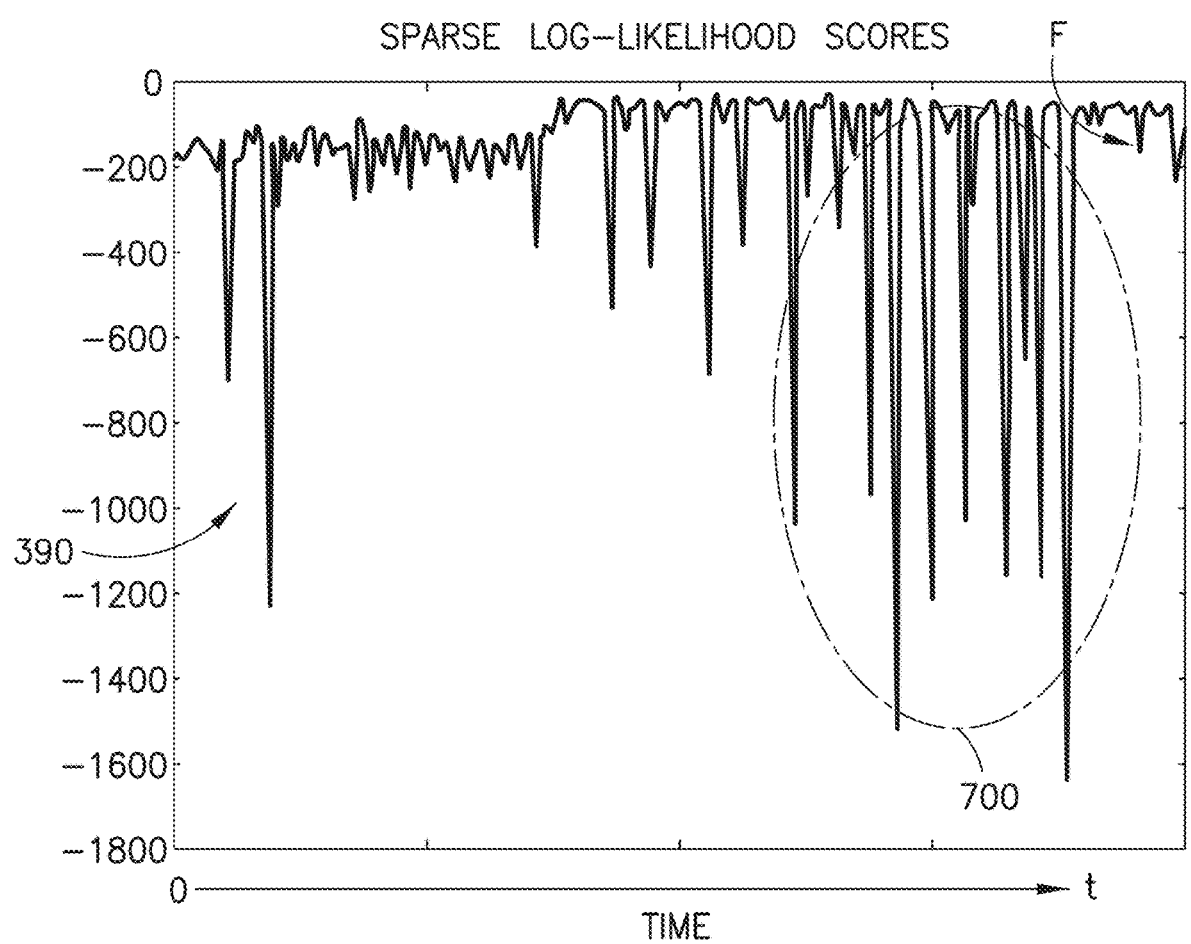
Figure 8:
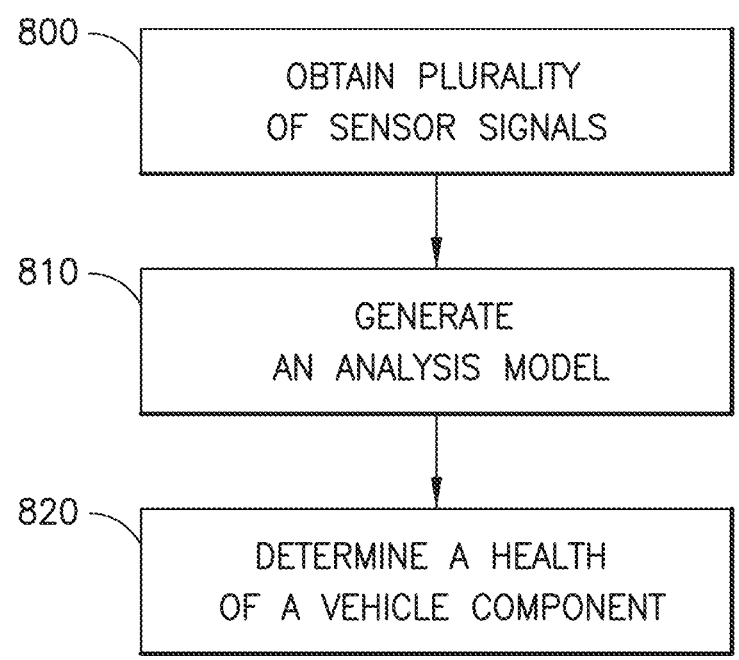
Figure 9:
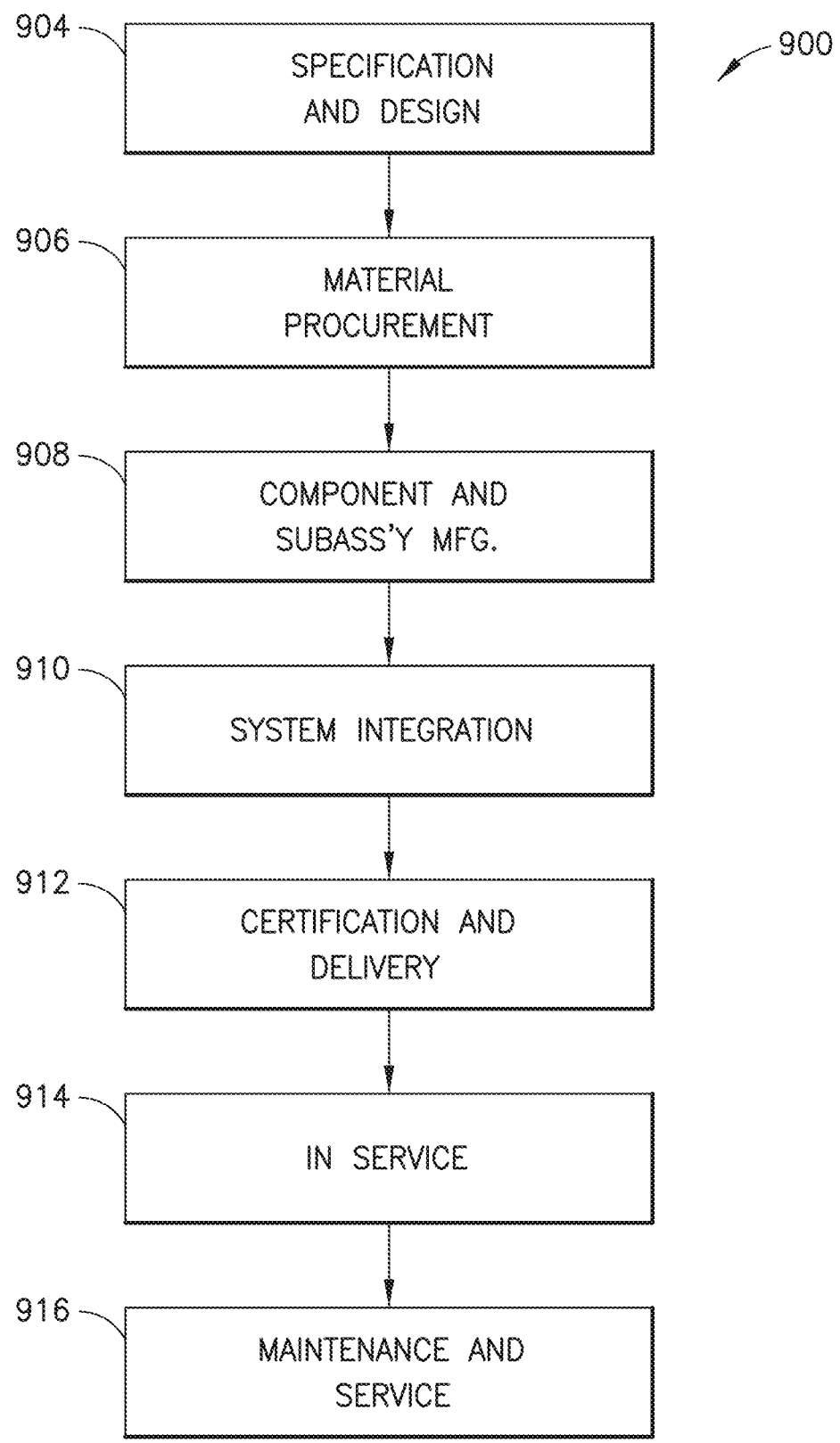

Having thus described examples of the disclosure in general terms, reference will now be made to the accompa- nying drawings, which are not necessarily drawn to scale, and wherein like reference characters designate the same or similar parts throughout the several views, and wherein:

FIG. 1 (which comprises FIGS. 1A and 1B) is a block diagram of a vehicle system prognosis device, according to aspects of the present disclosure;

FIG. 2 is a block diagram illustrating training of the vehicle system prognosis device, according to aspects of the present disclosure;

FIG. 3 is a block diagram of data analysis using the vehicle system prognosis device, according to aspects of the present disclosure;

FIG. 4 is a graph illustrating spurious fast Fourier transform data before filtering, according to aspects of the present disclosure;

FIG. 5 is a graph illustrating fast Fourier transform data after filtering, according to aspects of the present disclosure;

FIG. 6 is a graph illustrating an exemplary output of a low rank Gaussian model of the vehicle system prognosis device, according to aspects of the present disclosure;

FIG. 7 is a graph illustrating an exemplary output of a sparse Gaussian model of the vehicle system prognosis device, according to aspects of the present disclosure;

FIG. 8 is a flow diagram for a method of determining vehicle system prognosis, according to aspects of the present disclosure;

FIG. 9 is a flow diagram of aircraft production and service methodology; and

Figure 10:
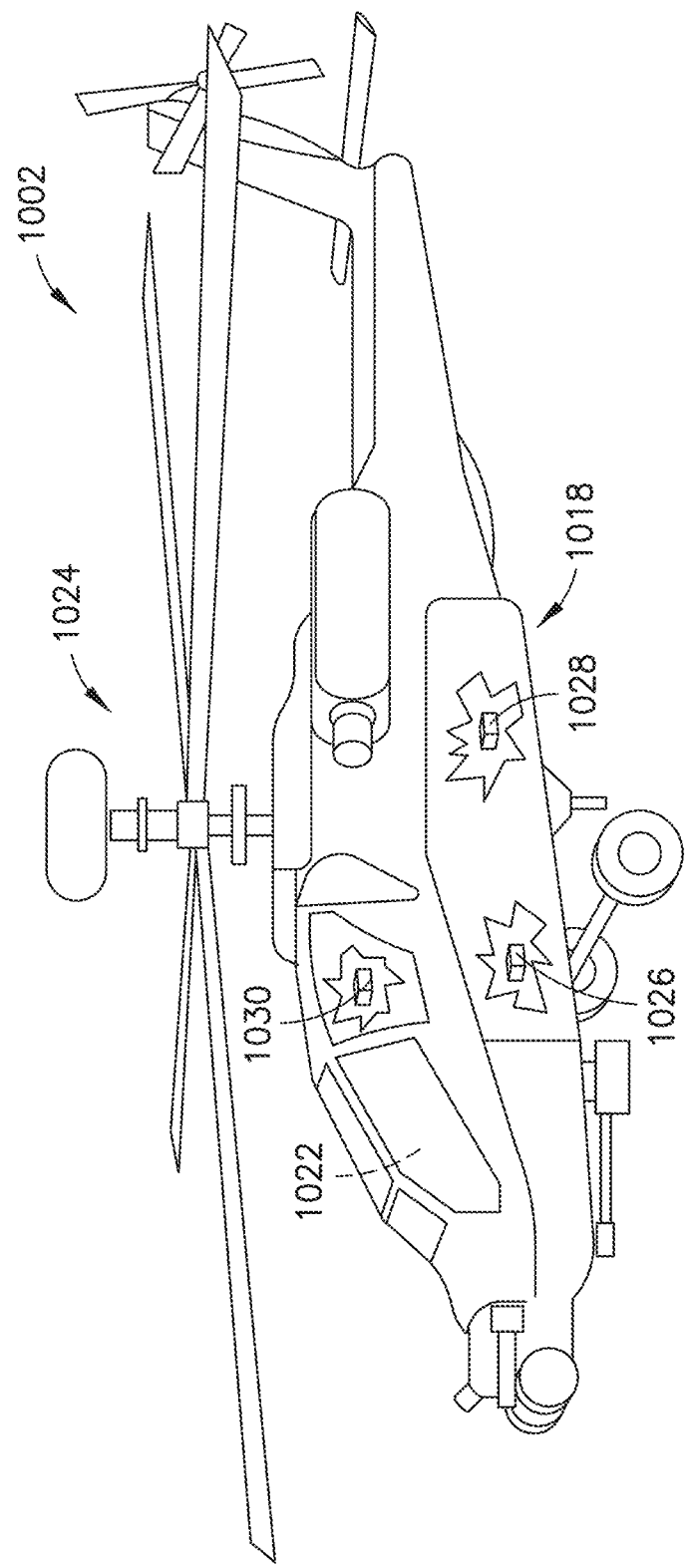

FIG. 10 is a schematic illustration of an aircraft including distributed vehicle systems.

In the block diagram(s) referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. Couplings other than those depicted in the block diagrams may also exist. Dashed lines, if any, connecting the various elements and/or components represent couplings similar in function and purpose to those represented by solid lines; however, couplings represented by the dashed lines may either be selectively provided or may relate to alternative or optional aspects of the disclosure. Likewise, elements and/or components, if any, represented with dashed lines, indicate alternative or optional aspects of the disclosure. Environmental elements, if any, are represented with dotted lines.

In the block diagram(s) referred to above, the blocks may also represent operations and/or portions thereof. Lines connecting the various blocks do not imply any particular order or dependency of the operations or portions thereof.

DETAILED DESCRIPTION

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Referring to FIG. 1 (comprising FIGS. 1A and 1B) and 10, the aspects of the present disclosure provide for a fault detection system 100 for a vehicle 1002 that predicts and diagnosis impending failures in components of the vehicle 1002 in substantially real-time (e.g., one second or less). A majority of conventional vehicle prognosis and diagnostics are based on thresholding of condition indicators that are developed by domain experts. This is in contrast to the fault detection system 100 according to the aspects of the present disclosure. For example, the fault detection system 100 does not rely on any explicitly designed condition indicators. Further, the fault detection system 100 in accordance with aspects of the present disclosure is able to perform prognosis and diagnosis where recorded sensor data (e.g., sensor signals 110) do not leave normal operating ranges for a corresponding vehicle system component 160, but instead only exhibit transient instabilities in their dynamics (these transient instabilities in the normal operating ranges of the sensor are referred to herein as "subtle" or "low intensity" signals of impending failure). It is noted that, in contrast to the aspects of the present disclosure, conventional diagnostic algorithms onboard a vehicle, such as vehicle 1002, generally only issue fault messages for a vehicle system component 160 when recorded sensor measurements enter abnormal ranges or exhibit dynamics that are far from normal and, as such, vehicle operators and maintenance personnel may be unaware that there is an impending failure of the vehicle system component 160. In addition, additional sensors or equipment need not be added to the vehicle 1002 in order to perform prognosis and diagnostics of existing vehicle sensors and related vehicle infrastructure with the fault detection system 100.

The fault detection system 100 in accordance with the aspects of the present disclosure may have several advantages relative to conventional vehicle prognosis and diagnostics systems that use condition indicators. For example, fault detection system 100 in accordance the aspects of the present disclosure may not use any domain specific knowledge of the systems of the vehicle; the data used by the fault detection system 100 may be unlabeled (e.g., the data does not need to be labeled as good or bad data); and the fault detection system 100 in accordance with the aspects of the present disclosure is applicable to different components/ systems of the vehicle 1002 without knowledge of specific information of the different components/systems of the vehicle 1002.

Still referring to FIG. 1 (comprising FIGS. 1A and 1B), the fault detection system 100 is a hybrid of sparse methods and statistical analysis based method. As will be described in further detail herein, the sparse methods component of the fault detection system 100 is incorporated through any suitable dictionary learning technique. The statistical methods are incorporated using any suitable Gaussian mixture model(s). The combining of the sparse methods and the statistical analysis based methods as described herein provides the fault detection system 100 with an ability to detect subtle signatures of failure for systems of the vehicle 1002 while remaining robust to changing operating regimes and system conditions.

In accordance with aspects of the present disclosure, the fault detection system 100 is data-driven and is not based on expert engineered condition indicators. The fault detection system 100 accepts analysis fast Fourier transform vector data time series 122-122n corresponding to an analysis data time series 112-112n of raw sensor signals 110 from, for example sensor(s) 150, as input and uses the analysis fast Fourier transform vector data time series 122-122n to generate a prediction or diagnosis of a health of the sensor 150 and a vehicle system component(s) 160 that the sensor 150 monitors. It should be understood that the fault detection system 100 in accordance with the aspects of the present disclosure is not limited by using fast Fourier transform vector data 120 and in other aspects the fault detection system 100 may use the analysis data time series 112-112n of raw sensor signals 110 as input for generating a prediction or diagnosis of a health of the sensor 150 and a vehicle system component(s) 160 that the sensor 150 monitors.

As will be described in greater detail below, the fault detection system 100 in accordance with the aspects of the present disclosure includes data preprocessing where high-fidelity training data, such as training fast Fourier transform vector data time series 121-121n is acquired without labeling the data as being good or bad. The fault detection system 100 also uses low rank and sparse representations of the data. The fault detection system 100 further uses Gaussian models (see sparse Gaussian model 170 and low rank Gaussian model 171) corresponding to the low rank and sparse parts of the data for generating early warning signal of impending component failure. The fault detection system 100 produces a final score from the likelihood of both the low rank Gaussian model 171 and the sparse Gaussian model 170, where this score serves as an indicator of impending failure of a corresponding vehicle system component 160. The fault detection system 100 in accordance with the aspects of the present disclosure may also perform system prognosis and diagnosis with partially labeled data when most of the data are normal cases (i.e., data obtained when the vehicle system component 160 is functioning properly) with some mix of abnormal cases (i.e., some spurious data is mixed with the normal case data).

Still referring to FIG. 1 (comprising FIGS. 1A and 1B), the fault detection system 100 includes one or more sensors 150, a data recorder 140 and an indicator device 180 all of which may be located onboard the vehicle 1002. The one or more sensors 150 may be coupled to or integrated with a corresponding vehicle system component 160 in any suitable manner. The one or more sensors 150 are configured to detect any suitable predetermined characteristics 160C of the corresponding vehicle system component 160. The predetermined characteristics 160C may include one or more of accelerations, torque, stress, strain, voltage, current, or any other suitable mechanical and/or electrical characteristic of the corresponding vehicle system component 160. The one or more sensors 150 generate a plurality of sensor signals 110 corresponding to the predetermined characteristic 160C. The one or more sensors 150 are coupled to the data recorder 140 in any suitable manner. For example, in one aspect, the one or more sensors 150 are coupled to the data recorder 140 through communication cable(s) 155; while in other aspects, the one or more sensors 150 are coupled to the data recorder 140 through any suitable wireless communications.

The data recorder 140 includes any suitable memory 140M and processor 140P that are configured to carry out the aspects of the present disclosure as described herein. For example, the processor 140P may include any suitable processing modules and the memory 140M may include any suitable non-transitory computer program code which when executed by the processor 140P causes the processor 140P to execute the aspects of the present disclosure described herein. In one aspect, the processor 140P includes a fast Fourier transform module 141, a pre-processing module 142, a model building module 143 and an analysis module 144. In other aspects, the processor 140P may include any other suitable processing modules necessary for carrying out the aspects of the present disclosure.

Referring now to FIG. 1 (comprising FIGS. 1A and 1B), 2 and 3, the fault detection system 100 is configured for two modes of operation. For example, FIG. 2 illustrates a flow diagram of a training mode or phase (referred to herein as training mode) 200 of the fault detection system 100; while FIG. 3 illustrates a flow diagram of an analysis/testing mode or phase (referred to herein as analysis mode 300) of the fault detection system 100.

Referring to FIG. 1 (comprising FIGS. 1A and 1B) and 2, when operating in the training mode 200, the fault detection system 100 processes sensor signals 110 from the one or more sensor 150 and creates a training data set 111TS. As will be described in greater detail below, the processor 140P uses the training data set 111TS to build an analysis model 130. As will also be described in greater detail below, when operating in the analysis mode 300, the processor 140P processes new data, derived from an analysis data set 111AS (obtained from corresponding sensor signals 110), using analysis model 130 to generate a score indicating a health of the vehicle system component 160 being monitored by the one or more sensor 150.

Referring to FIG. 1 (comprising FIGS. 1A and 1B) and 2, the sensor signals 110 from the one or more sensor 150 are digitized in any suitable manner and are accumulated/stored within the memory 140M for a predetermined period of time to form one or more training data time series 111-111n of sensor signals 110. For example, training data time series 111 includes training data TS1a-TSna that have been accumulated over a first predetermined time period while training data time series 111n includes training data TS1n-TSnn that have been accumulated over an $n^{th}$ predetermined time period (where n is an integer greater than 1). The processor 140P processes the training data time series 111-111n with the fast Fourier transform module 141 to convert the training data time series 111-111n into the spectral/frequency domain. The fast Fourier transform module 141 is configured to apply a fast Fourier transform to the training data time series 111-111n to convert each of the training data time series 111-111n to a respective training fast Fourier transform vector data time series 121-121n. For example, training fast Fourier transform data time series 121 includes fast Fourier transform vector training data TF1a-TFna corresponding to training data TS1a-TSna of training data time series 111; while fast Fourier transform vector data time series 121n includes fast Fourier transform vector training data TF1n-TFnn corresponding to training data TS1n-TSnn of training data time series 111n. In one aspect, the fault detection system 100 collects multiple instances of fast Fourier transform vector data 120 (e.g., the training fast Fourier transform vector data time series 121-121n) from the vehicle 1002 (see also FIG. 10) and at least another vehicle 1002A (having similar characteristics to vehicle 1002) at different times to create the training data set of fast Fourier transform vectors 121TS; while in other aspects, the fast Fourier transform vector data 120 may be collected from a single vehicle at different times to create the training data set of fast Fourier transform vectors 121TS. It is noted that collecting data from different vehicles having similar characteristics means that the data is collected from a number of vehicles all having the same type (e.g., where type indicates the same model and make of vehicle).

It is noted that the aspects of the present disclosure make a reasonable assumption that most, if not all, of the collected fast Fourier transform vector data 120 collected in the training data set of fast Fourier transform vectors 121TS was generated by the vehicle 1002 (and the at least another vehicle 1002A—see FIG. 1 (comprising FIGS. 1A and 1B)) under normal vehicle operating conditions (i.e., when the vehicle system components 160 being monitored were not failing—noting that, abnormal vehicle operating conditions are when the vehicle system components being monitored are failing). This assumption is reasonable in that the vehicle 1002, such as a rotary wing aircraft (or other well-engineered and well-maintained machine), includes vehicle system components 160 that generally operate within their respective design parameters. As such, with few exceptions, such as the inclusion of spurious data, the training data set of fast Fourier transform vectors 121TS includes and was generated from substantially only good data (i.e., data obtained under normal operating conditions of the vehicle system component 160 being monitored).

The processor 140P is configured to generate an analysis model 130 for each respective predetermined characteristic 160C corresponding to the vehicle system component 160 being monitored. The processor 140P is configured to train the analysis model 130 with the training data set of fast Fourier transform vectors 121TS that are generated from the plurality of sensor signals 110 obtained under normal operating conditions of the predetermined characteristic 160C. In one aspect, the processor 140P is configured to train the analysis model 130 with the training data set of fast Fourier transform vectors 121TS that are generated from the plurality of sensor signals 110 obtained only under normal operating conditions of the predetermined characteristic 160C. For example, still referring to FIG. 1 (comprising FIGS. 1A and 1B) and 2, the processor is configured to perform training pre-processing 210 on the training data set of fast Fourier transform vectors 121TS so that the processor can build the analysis model 130 from low rank and sparse representations of the training data set of fast Fourier transform vectors 121TS.

As noted above, the sensors signals 110 used to generate the training data set of fast Fourier transform vectors 121TS may include some spurious data. This means that some of the fast Fourier transform vectors 121V (FIG. 4) in the training data set of fast Fourier transform vectors 121TS may also be spurious as illustrated in FIG. 4. The processor 140P is configured to filter the spurious fast Fourier transform vectors 121V with the training pre-processing 210. It is noted that most fast Fourier transform data are assumed to be similar in the spectral domain. As such, the purpose of the training pre-processing 210 is to get a representative set of normal data (i.e., data obtained under normal vehicle operating conditions) representing the predetermined characteristics 160C of the vehicle system component 160 being monitored. The training pre-processing 210 may be necessary because the sensor signals 110 are not labeled as good or bad, knowing that the amount of bad/abnormal data (i.e., data obtained under abnormal vehicle operating conditions) is significantly less than the amount of normal data (i.e., data obtained under normal vehicle operating conditions).

The training pre-processing 210 includes the filtering or removal of invalid records (referred to herein as "norm filtering" 211). It is noted that a number of fast Fourier transform vectors 121V are invalid, e.g., the fast Fourier transform vectors 121V are so large that the data is unreasonable or even nonsensical so as to amount to a physical impossibility (i.e., it is physically impossible for the vehicle system component 160 to generate a predetermined characteristic that would result in the invalid fast Fourier transform vectors 121V). For example, norm filtering 211 removes fast Fourier transform vectors 121V that exceed a predetermined threshold such as a range of physically feasible values (e.g., vectors with infinite or close to infinite values) where a typical threshold would be, for example, 1000-10000. FIG. 4 illustrates the fast Fourier transform vectors 121V before norm filtering 211, while FIG. 5 illustrates the fast Fourier transform vectors 121V after norm filtering 211.

Referring to FIG. 1 (comprising FIGS. 1A and 1B), 2 and 5, training pre-processing 210 also includes the statistical filtering of the training data set of fast Fourier transform vectors 121TS based on predetermined features (referred to herein as "feature filtering" 212). For example, feature filtering 212 filters the training data set of fast Fourier transform vectors 121TS (previously filtered by norm filtering 211) based on the mean and standard deviation for each or at least one spectral component of the training data set of fast Fourier transform vectors 121TS. The mean and standard deviation are calculated by, for example, the pre-processing module 142 for each or at least one spectral bin (see FIG. 5 which illustrates the spectral/frequency bins). The feature filtering 212 excludes fast Fourier transport vectors 121V that include components with amplitudes that are greater than:

$$\text{mean}+K*\text{std} \quad [1]$$

or less than:

$$\text{mean}-K*\text{std} \quad [2]$$

where, std is the standard deviation and K is a constant. For exemplary purposes only, K may have a typical value of 3 so that the feature filtering 212 captures and provides statistically meaningful data in the frequency spectrum. It is noted that the statistically meaningful data is amenable to sparse non-complex structure relative to the size of the input.

The training pre-processing 210 further includes bin compression 213. The processor 140P may be configured to compress the original number of spectral bins $SB_{original}$ by a predetermined factor of C so that:

$$N_{comp} = N_{original}C \quad [3]$$

For example, the processor 140P is configured to compress an original number of spectral bins $N_{original}$ of the training data set of fast Fourier transform vectors 121TS to a compressed number of spectral bins $N_{comp}$ so that each or at least one spectral bin (e.g., newBin[i]) in the compressed number of spectral bins $N_{comp}$ is an average amplitude of a corresponding number of spectral bins (e.g., bin) in the original number of spectral bins $N_{original}$.

In one aspect the bin compression 213 may be performed with the following algorithm:
For each I in range [0, $N_{comp}-1$]

$$\text{newBin}[i]=\text{SUM}(\text{bin}[i*C:(i+1)*C])/C$$

Still referring to FIG. 1 (comprising FIGS. 1A and 1B) and 2, the result of the training pre-processing 210 is filtered (and compressed) fast Fourier transform vector data 215 that includes one or more fast Fourier transform vectors 215V. The one or more fast Fourier transform vectors 215V form a filtered training data set of fast Fourier transform vectors 121TSC that are derived from the training data set of fast Fourier transform vectors 121TS. The processor 140P is configured to generate the analysis model 130 using the filtered fast Fourier transform vector data 215 (e.g., the filtered training data set of fast Fourier transform vectors 121TS in a filtered and compressed form). For example, the model building module 143 of the processor 140P is based on sparse and low range representations of the filtered fast Fourier transform vector data 215. During model building 220 the processor 140P, through the model building module 143, applies dictionary learning 221 to the one or more fast Fourier transform vectors 215V of the filtered fast Fourier transform vector data 215, which results in a set of vectors (i.e., learned dictionary 221L—FIG. 3) that is used for the decomposition of the one or more fast Fourier transform vectors 215V in the filtered fast Fourier transform vector data 215. The dictionary learning 221 extracts useful features (e.g., low rank representations and sparse representations) from high-dimensional FFT data (e.g., the filtered training data set of fast Fourier transform vectors 121TSC), which allows the analysis model 130 to generalize to new data (e.g., a filtered analysis data set of fast Fourier transform vectors described herein—see FIG. 3) which was not used to train the analysis model 130. As described above, the filtered training data set of fast Fourier transform vectors 121TSC are generated from the plurality of sensor signals 110 obtained under normal operating conditions of the predetermined characteristic 160C. Any suitable dictionary learning techniques may be used in the model building module 143 such as, for example, online or offline dictionary learning using any suitable algorithms including but not limited to matching pursuit, least absolute shrinkage and selection operator (LASSO), K-SVD (singular value decomposition), Stochastic gradient descent, Lagrange dual method, or any other suitable dictionary learning technique.

The processor decomposes the one or more fast Fourier transform vectors 215V in the filtered training data set of fast Fourier transform vectors 121TSC included in the filtered fast Fourier transform vector data 215. The decomposition of the one or more fast Fourier transform vectors 215V in the filtered training data set of fast Fourier transform vectors 121TSC represents a low rank portion/part 222L of the analysis model 130. The low rank part 222L includes a set of coefficients representing weights 222LW for dictionary elements of the learned dictionary 221L to reconstruct a given one of the fast Fourier transform vectors 215V. With the learned dictionary 221L, reconstruction algorithms are applied to the decomposed fast Fourier transform vectors 215V to reconstruct the one or more fast Fourier transform vectors 215V derived from the training data set of fast Fourier transform vectors 121TS to generate the set of weights 222LW for each or at least one of the one or more fast Fourier transform vectors 215V. Any suitable reconstruction algorithms may be applied including but not limited to orthogonal matching pursuit (OMP) and LASSO.

The processor 140P, through the model building module 143, is also configured to calculate a residual vector 215VR for each fast Fourier transform vector 215V in the filtered training data set of fast Fourier transform vectors 121TSC. The residual vector 215VR represents a difference between a respective fast Fourier transform vector 215V in the filtered training data set of fast Fourier transform vectors 121TSC and a reconstructed fast Fourier transform vector 215VC corresponding to the respective fast Fourier transform vector 215V of the filtered training data set of fast Fourier transform vectors 121TSC. The residual vectors 215VR of the decomposition represent and are used by the processor to determine a sparse portion/part 222S of the analysis model 130.

The processor 140P, through the model building module 143, is configured to generate a low rank Gaussian model 171 for the low rank portion 222L and a sparse Gaussian model 170 for the sparse portion 222S based on the residual vector 215VR for each fast Fourier transform vector 215V in the filtered training data set of fast Fourier transform vectors 121TSC. The low rank Gaussian model 171 and the sparse Gaussian model 170 may be any suitable Gaussian models (inclusive of Bayesian Gaussian mixture models) generated in any suitable manner. The low rank Gaussian model 171 and the sparse Gaussian model 170 are configured to produce a score 390, such as a log likelihood for the fast Fourier transform vectors 215V of the filtered fast Fourier transform vector data 215 as will be described herein.

Referring now to FIG. 1 (comprising FIGS. 1A and 1B) and 3, as described above, the fault detection system 100 is configured for two modes of operation, the training mode 200 (see FIG. 2) and the analysis mode 300 (FIG. 3). Once the analysis model 130 (including the low rank Gaussian model 171, the sparse Gaussian model 170 and the learned dictionary 221L (see FIG. 1 (comprising FIGS. 1A and 1B), 2 and 3)) are generated using the training mode 200 (as described above with respect to FIGS. 1 (comprising FIGS. 1A and 1B) and 2), the processor 140P, operating in the analysis mode 300, determines a health of the vehicle system component 160 from the sensor signals 110. During the determination of the health of the vehicle system component 160, at least some of the data processing operations performed by the processor 140P in analysis mode 300 may be substantially similar to the data processing operations performed by the processor 140P in the training mode. For example, the processor 140P receives the sensor signals 110 from the one or more sensors 150 in a manner substantially similar to that described above.

The sensor signals 110 from the one or more sensor 150 are digitized in any suitable manner and are accumulated/stored within the memory 140M for a predetermined period of time to form one or more analysis data time series 112-112$n$ of sensor signals 110. For example, analysis data time series 112 includes analysis data AS1a-ASna that have been accumulated over a first predetermined time period while analysis data time series 112$n$ includes analysis data AS1n-ASnn that have been accumulated over an $n^{th}$ predetermined time period (where n is an integer greater than 1). The processor 140P processes the analysis data time series 112-112$n$ with the fast Fourier transform module 141 to convert the analysis data time series 112-112$n$ into the spectral/frequency domain.

Still referring to FIG. 1 (comprising FIGS. 1A and 1B) and 3, the fast Fourier module 141 is configured to apply a fast Fourier transform to the analysis data time series 112-112$n$ to convert each of the analysis data time series 112-112$n$ to a respective analysis fast Fourier transform vector data time series 122-122$n$. For example, analysis fast Fourier transform vector data time series 122 includes fast Fourier transform vector analysis data AF1a-AFna corresponding to analysis data AS1a-ASna of analysis data time series 112; while fast Fourier transform vector data time series 122$n$ includes fast Fourier transform vector analysis data AF1n-AFnn corresponding to analysis data AS1n-ASnn of analysis data time series 112$n$. In one aspect, the fault detection system 100 collects multiple instances of fast Fourier transform vector data 120 (e.g., the analysis fast Fourier transform vector data time series 122-122$n$) from the vehicle 1002 (see also FIG. 10) at different times to create the analysis data set of fast Fourier transform vectors 122AS.

In the analysis mode 300 the processor is configured to pre-process the fast Fourier transform vector data 120 in a manner substantially similar to that described above with respect to the training mode 200 (FIG. 2). However, in one aspect, in the analysis mode 300 the pre-processing 310 only includes norm filtering 211 and bin compression 213; while in other aspects, feature filtering 212 (FIG. 2) may also be included in the analysis mode 300. As in the training mode 200 (FIG. 2), the pre-processing 310 performed in the analysis mode 300 produces filtered fast Fourier transform vector data 315 (e.g., the analysis data set of fast Fourier transform vector data 122AS in a filtered and compressed form) which defines a filtered analysis data set of fast Fourier transform vectors 122ASC.

The processor 140P inputs the filtered fast Fourier transform vector data 315 into the analysis model 130 to determine the health of the vehicle system component 160, where the analysis model 130 provides a degree (e.g., score 390) to which the one or more fast Fourier transform vectors AF1a-AFnn in the filtered analysis data set of fast Fourier transform vectors 122ASC could have been generated by the analysis model 130. For example, the processor 140P, through the analysis module 144, applies the learned dictionary 221L to the filtered fast Fourier transform vector data 315 to obtain sparse and low rank representations 322 of the filtered fast Fourier transform vector data 315. The sparse and low rank representations 322 are decomposed, in a manner substantially similar to that described above with respect to the training mode 200 (FIG. 2), to determine a low rank portion/part 322L of the one or more fast Fourier transform vectors 315V in the filtered fast Fourier transform vector data 315. For example, the learned dictionary 221L is applied to the filtered analysis data set of fast Fourier transform vectors 122ASC to create the low rank part 322L and sparse part 322S decompositions of the filtered analysis data set of fast Fourier transform vectors 122ASC. In a manner similar to that described above, the low rank part 322L includes a set of coefficients representing weights 322LW for dictionary elements of the learned dictionary 221L to reconstruct a given one of the fast Fourier transform vectors 315V.

The application of the learned dictionary 221L to the filtered analysis data set of fast Fourier transform vectors 122ASC also provides residual vectors 315VR which are used by the processor 140P when determining the sparse part 322S of the one or more fast Fourier transform vectors 315V. In a manner similar to that described above, the processor 140P is configured to calculate the residual vector 315VR for each fast Fourier transform vector 315V in the filtered analysis data set of fast Fourier transform vectors 122ASC. The residual vector 315VR represents a difference between a respective fast Fourier transform vector 315V in the filtered analysis data set of fast Fourier transform vectors 122ASC and a reconstructed fast Fourier transform vector 315VC corresponding to the respective fast Fourier transform vector 315V of the filtered analysis data set of fast Fourier transform vectors 122ASC.

The processor 140P applies the low rank Gaussian model 171, created during the model building 220 (FIG. 2), to the low rank part 322L to determine a degree or likelihood (such as the log-likelihood) to which the one or more fast Fourier transform vectors 315V of the filtered fast Fourier transform vector data 315 could have been generated by the analysis model 130. For example, the low rank coefficients (e.g., weights 322LW) are provided into the low rank Gaussian model 171 to determine the log-likelihood LLH of the low rank decomposition (e.g., the low rank part 322L).

The processor 140P provides the sparse part 322S to the sparse Gaussian model 170, created during the model building 220 (FIG. 2), and employs the sparse Gaussian model 170 to determine the degree to which the one or more fast Fourier transform vectors 315V could have been generated by the analysis model 130. For example, the sparse part 322S is provided into the sparse Gaussian model 170 to determine the log-likelihood SLH of the sparse decomposition (e.g., the low rank part 322L).

The log-likelihoods LLH, SLH each measure the degree to which an observed one of the fast Fourier transform vectors 315V of the filtered analysis data set of fast Fourier transform vectors 122ASC could have been generated by the analysis model 130 that was learned based on the training data (e.g., the filtered training data set of fast Fourier transform vectors 121TSC). For example, the closer the fast Fourier transform vectors 315V is to the normal data (e.g., the filtered training data set of fast Fourier transform vectors 121TSC obtained under normal operating conditions of the vehicle 1002) use for training of the analysis model 130, the higher the log-likelihoods LLH, SLH produced by the low rank Gaussian model 171 and the sparse Gaussian model 170. The log-likelihoods LLH, SLH may be used as the score 390 or used to generate the score 390. For example, the log-likelihoods may be correlated to a generalized scale where, e.g., a score of 1 (or the color green) means the vehicle system component 160 (FIG. 1 (comprising FIGS. 1A and 1B)) is operating normally, a score of 2 (or the color yellow) means the vehicle system component is operating abnormally and there is an impending failure, and a score of 3 (or the color red) means the vehicle system component has failed. The log-likelihood LLH, SLH scores 390 produced by the low rank Gaussian model 171 and the sparse Gaussian model 170 can be used separately or they can be combined as a sum, a weighted sum, or combined in any other suitable manner used to merge output of different classifiers. For exemplary purposes, FIG. 6 illustrates an exemplary graph showing the log-likelihoods LLH produced by the low rank Gaussian model 171. FIG. 7 illustrates an exemplary graph showing the log-likelihoods SLH produced by the sparse Gaussian model 170.

In one aspect, the low rank Gaussian model 171 and the sparse Gaussian model 170 may be considered as the analysis model 130 since the low rank Gaussian model 171 and the sparse Gaussian 170 model specify all of the parameters necessary to compute the degree (e.g., log-likelihoods LLH, SLH) to which an observed data point (e.g., a fast Fourier transform vector 315V) could have been generated by a respective one of the low rank Gaussian model 171 and the sparse Gaussian model 170. In another aspect, the analysis model 130 may be considered a combination of the low rank Gaussian model 171, the sparse Gaussian model 170 and the mean and standard deviation (i.e., z-score or standard score parameters) of the log-likelihood generated using normal data (i.e., the fast Fourier transform vectors 215V obtained under normal operating conditions of the vehicle 1002).

The z-score parameters may indicate if a previously unobserved data point (e.g., fast Fourier transform vectors 315V—FIG. 3) is normal or abnormal. For example, referring again to FIG. 2, in the training mode 200, the processor 140P may be configured to generate a mean low rank log-likelihood LLHM from the low rank part 222L of the filtered training data set of fast Fourier transform vectors 121TSC (which as noted above was obtained under normal operating conditions of the vehicle 1002—FIG. 1 (comprising FIGS. 1A and 1B)). The processor 140P may also be configured to generate a mean sparse log-likelihood SLHM from the sparse part 222S of the filtered training data set of fast Fourier transform vectors 121TSC. Referring also to FIG. 3, the processor 140P may be configured to compare the low rank log-likelihood LLH for each fast Fourier transform vector 315V with the mean low rank log-likelihood LLHM. If the low rank log-likelihood LLH is within a predetermined value (e.g., about 3 standard deviations) of the mean low rank log-likelihood LLHM then the corresponding fast Fourier transform vector 315V may be considered to be normal (e.g., the vehicle system component 160 being monitored is operating under normal conditions). If the low rank log-likelihood LLH is outside a predetermined value (e.g., about 3 standard deviations) of the mean low rank log-likelihood LLHM then the corresponding fast Fourier transform vector 315V may be considered to be abnormal (e.g., the vehicle system component 160 being monitored is operating abnormally indicating an impending failure).

Similarly, still referring to FIGS. 2 and 3, the processor 140P may be configured to compare the sparse log-likelihood SLH for each fast Fourier transform vector 315V with the mean sparse log-likelihood LLHM. If the sparse log-likelihood SLH is within a predetermined value (e.g., about 3 standard deviations) of the mean sparse log-likelihood SLHM then the corresponding fast Fourier transform vector 315V may be considered to be normal (e.g., the vehicle system component 160 being monitored is operating under normal conditions). If the sparse log-likelihood SLH is outside a predetermined value (e.g., about 3 standard deviations) of the mean sparse log-likelihood SLHM then the corresponding fast Fourier transform vector 315V may be considered to be abnormal (e.g., the vehicle system component 160 being monitored is operating abnormally indicating an impending failure).

Referring again to FIG. 1 (comprising FIGS. 1A and 1B), as described above, the fault detection system 100 also includes an indicator device 180. The indicator device 180 is in communication with the processor 140P such that the processor 140P causes the indicator device 180 to present an operational status 181 of the vehicle system component 160 being monitored to an operator or maintenance personnel of the vehicle 1002. For example, the operational status 181 may include a presentation of the score 390 (FIG. 3) for each of the vehicle system components 160 being monitored. The operational status 181 may be presented to the operator or maintenance personnel in substantially real time.

Referring now to FIG. 1 (comprising FIGS. 1A and 1B), 2, 3, and 8 an exemplary method will be described in accordance with aspects of the present disclosure. For example, the processor 140P onboard the vehicle 1002 obtains a plurality of sensor signals 110 corresponding to a predetermined characteristic 160C of the vehicle 1002 from one or more sensors 150 onboard the vehicle 1002 (FIG. 8, Block 800). As described above, the sensor signals 110 may be accumulated to form the training data set 111TS. The processor 140P generates the analysis model 130 for the predetermined characteristic 160C, in the manner described above, using the training data set 111TS (FIG. 8, Block 810). The analysis model 130 is trained by the processor with the training data set of fast Fourier transform vectors 121TS that are generated from the plurality of sensor signals 110 obtained under normal operating conditions of the predetermined characteristic 160C. The processor 140P determines a health of a vehicle system component 160 corresponding to the predetermined characteristic 160C with the analysis model 130 (FIG. 8, Block 820) in the manner described above.

Referring to FIG. 1 (comprising FIGS. 1A and 1B), 6 and 7 an exemplary implementation of the fault detection system 100 will be described. In this exemplary implementation sensor signals 110 were obtained from the modern signal processing unit of a rotary wing aircraft (e.g., vehicle 1002). In this implementation the sensor signals 110 correspond to a predetermined characteristic 160C of a main gearbox of the rotary wing aircraft. The sensor signals 110 were obtained with the rotary wing aircraft on the ground with its blades at a flat pitch and rotating at full speed. These sensor signals 110 were used to generate the training fast Fourier transform vector data time series 121-121n and the analysis data set of fast Fourier transform vectors 122AS. The training fast Fourier transform vector data time series 121-121n and the analysis data set of fast Fourier transform vectors 122AS were used to create/train the sparse Gaussian model 170 and the low rank Gaussian model 171; as well as for the analysis of the vehicle system component 160 corresponding to the sensor signals 110. FIGS. 6 and 7 illustrate exemplary outputs of analysis performed by the fault detection system 100 which may be presented on the indicator device 180. FIG. 6 illustrates the log-likelihood LLH output of the low rank Gaussian model 171, while FIG. 7 illustrates the log-likelihood SLH scores 390 of the sparse Gaussian model 170. FIGS. 6 and 7 illustrate that both the low rank Gaussian model 171 and the sparse Gaussian model 170 produce large score spikes 600, 700 of the log-likelihood LLH, SLH scores 390 (relative to other scores 390 in the output) for a time period prior to a documented failure F of the main gear box. These large score spikes 600, 700 are an early indication of the degradation of the health of the main gearbox (e.g., the vehicle system component 160) and indicate an impending failure of the main gearbox.

As can be seen from the above, the vehicle fault detection system 100, and its related method, may be employed directly onboard the vehicle 1002 (FIG. 10) to provide substantially real-time prognostics and diagnostics to vehicle operators and maintenance personnel. The fault detection system 100, and its related method, may also be employed in an offline manner to provide forensic analysis of troublesome faults and development of new algorithms for better leveraging of information recorded by the data recorder 140 (FIG. 1 (comprising FIGS. 1A and 1B)), such as a modern signal processing unit.

The disclosure and drawing figures describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, in some aspects of the disclosure, not all operations described herein need be performed.

Examples of the disclosure may be described in the context of an aircraft manufacturing and service method 900 as shown in FIG. 9 and a vehicle 1002 as shown in FIG. 10. During pre-production, illustrative method 900 may include specification and design 904 of the vehicle 1002 and material procurement 906. During production, component and subassembly manufacturing 908 and system integration 910 of the vehicle 1002 take place. Thereafter, the vehicle 1002 may go through certification and delivery 912 to be placed in service 914. While in service by a customer, the vehicle 1002 is scheduled for routine maintenance and service 916 (which may also include modification, reconfiguration, refurbishment, and so on).

Each of the processes of the illustrative method 900 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 10, the vehicle 1002 produced by the illustrative method 900 may include an airframe 1018 with a plurality of high-level systems and an interior 1022. Examples of high-level systems, which are distributed throughout the aircraft, include one or more of a propulsion system 1024, an electrical power system 1026, a hydraulic system 1028, and an environmental system 1030. Any number of other systems may be included. The fault detection system 100 and methods described herein may be integrated into at least any one or more of the aforementioned vehicle systems 1024, 1026, 1028, 1030 or any other systems of the vehicle 1002. Although an aerospace example is shown, the principles of the invention may be applied to other industries, such as the automotive and maritime industries. Further, while the vehicle 1002 is illustrated as a rotary wing aircraft in other aspects the aircraft may be a fixed wing aircraft, a space vehicle, maritime vehicle or any other suitable terrestrial or extraterrestrial vehicle.

The system and methods shown or described herein may be employed during any one or more of the stages of the manufacturing and service method 900. For example, components or subassemblies corresponding to component and subassembly manufacturing 908 may be fabricated or manufactured in a manner similar to components or subassemblies produced while the vehicle 1002 is in service. Also, one or more aspects of the system, method, or combination thereof may be utilized during the production states 908 and 910, for example, by substantially expediting assembly of or reducing the cost of a vehicle 1002. Similarly, one or more aspects of the system or method realizations, or a combination thereof, may be utilized, for example and without limitation, while the vehicle 1002 is in service, e.g., operation, maintenance and service 916.

Different examples and aspects of the system and methods are disclosed herein that include a variety of components, features, and functionality. It should be understood that the various examples and aspects of the system and methods disclosed herein may include any of the components, features, and functionality of any of the other examples and aspects of the system and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

The following are provided in accordance with the aspects of the present disclosure:

A1. A fault detection system comprising:
one or more sensors onboard a vehicle, the one or more sensors being configured to detect a predetermined characteristic of the vehicle and generate a plurality of sensor signals corresponding to the predetermined characteristic;
a processor onboard the vehicle, the processor being configured to
receive the plurality of sensor signals from the one or more sensors,
generate one or more fast Fourier transform vectors based on the plurality of sensor signals so that the one or more fast Fourier transform vectors are representative of the predetermined characteristic,
generate an analysis model from a time history of the fast Fourier transform vectors, and determine, using the analysis model, a degree to which the one or more fast Fourier transform vectors could have been generated by the analysis model; and
an indicator in communication with the processor, the indicator being configured to communicate an operational status of the vehicle to an operator or crew member of the vehicle based on the degree to which the one or more fast Fourier transform vectors could have been generated by the analysis model.

A2. The fault detection system of paragraph A1, where the analysis model is trained with a training data set of fast Fourier transform vectors that are generated from the plurality of sensor signals obtained under normal operating conditions of the predetermined characteristic.

A3. The fault detection system of paragraph A2, wherein the plurality of sensor signals are obtained, under the normal operating conditions of the predetermined characteristic, over one or more predetermined time periods.

A4. The fault detection system of paragraph A3, wherein the processor is configured to generate a time series of fast Fourier transform vectors corresponding to the one or more predetermined time periods, the time series of fast Fourier transform vectors forming the training data set of fast Fourier transform vectors.

A5. The fault detection system of paragraph A2, wherein the training data set of fast Fourier transform vectors is generated from the plurality of sensor signals, the plurality of sensor signals being obtained from the vehicle and at least another vehicle.

A6. The fault detection system of paragraph A2, wherein the processor is further configured to filter spurious fast Fourier transform vectors from the training data set of fast Fourier transform vectors.

A7. The fault detection system of paragraph A6, wherein the processor is configured to filter the spurious fast Fourier transform vectors based on a pre-defined statistical norm threshold.

A8. The fault detection system of paragraph A7, wherein the pre-defined statistical norm threshold filters fast Fourier transform data that exceeds a predetermined range of physically feasible values.

A9. The fault detection system of paragraph A6, wherein the processor is configured to filter the spurious fast Fourier transform vectors based on a predetermined feature of the training data set of fast Fourier transform vectors.

A10. The fault detection system of paragraph A2, wherein the processor is configured to filter fast Fourier transform vectors from the training data set of fast Fourier transform vectors based on the mean and standard deviation of at least one spectral bin of the training data set of fast Fourier transform vectors.

A11. The fault detection system of paragraph A10, wherein the processor is configured to discard the fast Fourier transform vectors with an amplitude greater than the mean+(K*standard deviation), where K is a constant.

A12. The fault detection system of paragraph A10, wherein the processor is configured to discard the fast Fourier transform vectors with an amplitude less than the mean−(K*standard deviation), where K is a constant.

A13. The fault detection system of paragraph A2, wherein the processor is configured to compress an original number of spectral bins of the training data set of fast Fourier transform vectors to a compressed number of spectral bins so that at least one spectral bin in the compressed number of spectral bins is an average amplitude of a corresponding number of spectral bins in the original number of spectral bins.

A14. The fault detection system of paragraph A1, wherein the processor is further configured to filter spurious fast Fourier transform vectors from the one or more fast Fourier transform vectors.

A15. The fault detection system of paragraph A14, wherein the processor is configured to filter the spurious fast Fourier transform vectors based on a pre-defined statistical norm threshold.

A16. The fault detection system of paragraph A15, wherein the pre-defined statistical norm threshold filters fast Fourier transform data that exceeds a predetermined range of physically feasible values.

A17. The fault detection system of paragraph A14, wherein the processor is further configured to compress an original number of spectral bins of the one or more fast Fourier transform vectors to a compressed number of spectral bins so that at least one spectral bin in the compressed number of spectral bins is an average amplitude of a corresponding number of spectral bins in the original number of spectral bins.

A18. The fault detection system of paragraph A1, wherein the processor is further configured to generate the analysis model by:

applying dictionary learning to a training data set of fast Fourier transform vectors to create a learned dictionary, the training data set being generated from the plurality of sensor signals obtained under normal operating conditions of the predetermined characteristic, decomposing the one or more fast Fourier transform vectors in the training data set of fast Fourier transform vectors where decomposition of the one or more fast Fourier transform vectors in the training data set of fast Fourier transform vectors represents a low rank portion of the analysis model and a residual of the decomposition represents a sparse portion of the analysis model, reconstructing the one or more fast Fourier transform vectors in the training data set of fast Fourier transform vectors to generate a set of weights for each or at least one of the one or more fast Fourier transform vectors in the training data set of fast Fourier transform vectors, calculating a residual vector for each or at least one fast Fourier transform vector in the training data set of fast Fourier transform vectors, the residual vector representing a difference between a respective fast Fourier transform vector in the training data set of fast Fourier transform vectors and a reconstructed fast Fourier transform vector corresponding to the respective fast Fourier transform vector, and generating a low rank Gaussian model for the low rank portion and a sparse Gaussian model for the sparse portion based on the residual vector for each or at least one fast Fourier transform vector in the training data set of fast Fourier transform vectors.

A19. The fault detection system of paragraph A1, wherein the processor is further configured to determine, using the analysis model, the degree to which the one or more fast Fourier transform vectors could have been generated by the analysis model by one or more of:

determining a low rank portion of the one or more fast Fourier transform vectors, by decomposing the one or more fast Fourier transform vectors with a learned dictionary of the analysis model, and employing a low rank Gaussian model to determine the degree to which the one or more fast Fourier transform vectors could have been generated by the analysis model; and determining a sparse portion of the one or more fast Fourier transform vectors, by calculating a residual vector that represents a difference between a respective one of the one or more fast Fourier transform vectors and a reconstructed fast Fourier transform corresponding to respective one of the one or more fast Fourier transform vectors, and employing a sparse Gaussian model to determine the degree to which the one or more fast Fourier transform vectors could have been generated by the analysis model.

A20. The fault detection system of paragraph A1, wherein the vehicle is an aerospace vehicle.

A21. The fault detection system of paragraph A1, wherein the vehicle is an airplane.

B1. A fault detection system comprising:

one or more sensors onboard a vehicle, the one or more sensors being configured to detect a predetermined characteristic of the vehicle and generate a plurality of sensor signals corresponding to the predetermined characteristic; and a processor onboard the vehicle and in communication with the one or more sensors, the processor being configured to generate an analysis model for the predetermined characteristic, the analysis model being trained by the processor with a training data set of fast Fourier transform vectors that are generated from the plurality of sensor signals obtained under normal operating conditions of the predetermined characteristic, and determine a health of a vehicle component corresponding to the predetermined characteristic with the analysis model.

B2. The fault detection system of paragraph B1, wherein the processor is configured to:

receive the plurality of sensor signals from the one or more sensors, generate one or more fast Fourier transform vectors based on the plurality of sensor signals so that the one or more fast Fourier transform vectors are representative of the predetermined characteristic; and determine the health of the vehicle component using the analysis model where the analysis model provides a degree to which the one or more fast Fourier transform vectors could have been generated by the analysis model.

B3. The fault detection system of paragraph B1, further comprising an indicator in communication with the processor, the indicator being configured to communicate the health of the vehicle component to an operator or crew member of the vehicle.

B4. The fault detection system of paragraph B1, where the training data set of fast Fourier transform vectors includes data from the vehicle and at least another vehicle.

B5. The fault detection system of paragraph B1, wherein the plurality of sensor signals are obtained, under the normal operating conditions of the predetermined characteristic, over one or more predetermined time periods.

B6. The fault detection system of paragraph B5, wherein the processor is configured to generate a time series of fast Fourier transform vectors corresponding to the one or more predetermined time periods, the time series of fast Fourier transform vectors forming the training data set of fast Fourier transform vectors.

B7. The fault detection system of paragraph B1, wherein the processor is further configured to filter spurious fast Fourier transform vectors from the training data set of fast Fourier transform vectors.

B8. The fault detection system of paragraph B7, wherein the processor is configured to filter the spurious fast Fourier transform vectors based on a pre-defined statistical norm threshold.

B9. The fault detection system of paragraph B8, wherein the pre-defined statistical norm threshold filters fast Fourier transform data that exceeds a predetermined range of physically feasible values.

B10. The fault detection system of paragraph B7, wherein the processor is configured to filter the spurious fast Fourier transform vectors based on a predetermined feature of the training data set of fast Fourier transform vectors.

B11. The fault detection system of paragraph B1, wherein the processor is configured to filter fast Fourier transform vectors from the training data set of fast Fourier transform vectors based on the mean and standard deviation of at least one spectral bin of the training data set of fast Fourier transform vectors.

B12. The fault detection system of paragraph B11, wherein the processor is configured to discard the fast Fourier transform vectors with an amplitude greater than the mean+(K*standard deviation), where K is a constant.

B13. The fault detection system of paragraph B11, wherein the processor is configured to discard the fast Fourier transform vectors with an amplitude less than the mean−(K*standard deviation), where K is a constant.

B14. The fault detection system of paragraph B1, wherein the processor is configured to compress an original number of spectral bins of the training data set of fast Fourier transform vectors to a compressed number of spectral bins so that at least one spectral bin in the compressed number of spectral bins is an average amplitude of a corresponding number of spectral bins in the original number of spectral bins.

B15. The fault detection system of paragraph A1, wherein the processor is further configured to filter spurious fast Fourier transform vectors from the one or more fast Fourier transform vectors.

B16. The fault detection system of paragraph B15, wherein the processor is configured to filter the spurious fast Fourier transform vectors based on a pre-defined statistical norm threshold.

B17. The fault detection system of paragraph B16, wherein the pre-defined statistical norm threshold filters fast Fourier transform data that exceeds a predetermined range of physically feasible values.

B18. The fault detection system of paragraph B15, wherein the processor is further configured to compress an original number of spectral bins of the one or more fast Fourier transform vectors to a compressed number of spectral bins so that at least one spectral bin in the compressed number of spectral bins is an average amplitude of a corresponding number of spectral bins in the original number of spectral bins.

B19. The fault detection system of paragraph B1, wherein the processor is further configured to generate the analysis model by:

applying dictionary learning to a training data set of fast Fourier transform vectors to create a learned dictionary, the training data set of fast Fourier transform vectors being generated from the plurality of sensor signals obtained under normal operating conditions of the predetermined characteristic, decomposing the one or more fast Fourier transform vectors in the training data set of fast Fourier transform vectors where decomposition of the one or more fast Fourier transform vectors in the training data set of fast Fourier transform vectors represents a low rank portion of the analysis model and residual of the decomposition represents a sparse portion of the analysis model, reconstructing the one or more fast Fourier transform vectors in the training data set of fast Fourier transform vectors to generate a set of weights for each or at least one of the one or more fast Fourier transform vectors in the training data set of fast Fourier transform vectors, calculating a residual vector for each or at least one fast Fourier transform vector in the training data set of fast Fourier transform vectors, the residual vector representing a difference between a respective fast Fourier transform vector in the training data set of fast Fourier transform vectors and a reconstructed fast Fourier transform vector corresponding to the respective fast Fourier transform vector, and generating a low rank Gaussian model for the low rank portion and a sparse Gaussian model for the sparse portion based on the residual vector for each or at least one fast Fourier transform vector in the training data set of fast Fourier transform vectors.

B20. The fault detection system of paragraph B1, wherein the processor is further configured to determine, using the analysis model, a degree to which the one or more fast Fourier transform vectors could have been generated by the analysis model by one or more of:

determining a low rank portion of the one or more fast Fourier transform vectors, by decomposing the one or more fast Fourier transform vectors with a learned dictionary of the analysis model, and employing a low rank Gaussian model to determine the degree to which the one or more fast Fourier transform vectors could have been generated by the analysis model; and determining a sparse portion of the one or more fast Fourier transform vectors, by calculating a residual vector that represents a difference between a respective one of the one or more fast Fourier transform vectors and a reconstructed fast Fourier transform vector corresponding to respective one of the one or more fast Fourier transform vectors, and employing a sparse Gaussian model to determine the degree to which the one or more fast Fourier transform vectors could have been generated by the analysis model.

B21. The fault detection system of paragraph B1, wherein the vehicle is an aerospace vehicle.

B22. The fault detection system of paragraph B1, wherein the vehicle is an airplane.

C1. A non-transitory computer readable medium storing computer readable instructions that when executed by a computer cause the computer to perform a method comprising:

obtaining, with a processor onboard a vehicle, a plurality of sensor signals corresponding to a predetermined characteristic of the vehicle from one or more sensors onboard the vehicle;

generating, with the processor, an analysis model for the predetermined characteristic, the analysis model being trained by the processor with a training data set of fast Fourier transform vectors that are generated from the plurality of sensor signals obtained under normal operating conditions of the predetermined characteristic; and determining, with the processor, a health of a vehicle component corresponding to the predetermined characteristic with the analysis model.

C2. The non-transitory computer readable medium of paragraph C1, wherein the method further comprises:

generating, with the processor, one or more fast Fourier transform vectors based on the plurality of sensor signals so that the one or more fast Fourier transform vectors are representative of the predetermined characteristic; and wherein the processor determines the health of the vehicle component using the analysis model where the analysis model provides a degree to which the one or more fast Fourier transform vectors could have been generated by the analysis model.

C3. The non-transitory computer readable medium of paragraph C1, wherein the method further comprises communicating, with indicator in communication with the processor, the health of the vehicle component to an operator or crew member of the vehicle.

C4. The non-transitory computer readable medium of paragraph C1, where the training data set of fast Fourier transform vectors includes data from the vehicle and at least another vehicle.

C5. The non-transitory computer readable medium of paragraph C1, wherein the plurality of sensor signals are obtained, under the normal operating conditions of the predetermined characteristic, over one or more predetermined time periods.

C6. The non-transitory computer readable medium of paragraph C5, wherein the method further comprises generating, with the processor, a time series of fast Fourier transform vectors corresponding to the one or more predetermined time periods, the time series of fast Fourier transform vectors forming the training data set of fast Fourier transform vectors.

C7. The non-transitory computer readable medium of paragraph C1, wherein the method further comprises filtering, with the processor, spurious fast Fourier transform vectors from the training data set of fast Fourier transform vectors.

C8. The non-transitory computer readable medium of paragraph C7, wherein the spurious fast Fourier transform vectors are filtered based on a pre-defined statistical norm threshold.

C9. The non-transitory computer readable medium of paragraph C8, wherein the pre-defined statistical norm threshold filters fast Fourier transform data that exceeds a predetermined range of physically feasible values.

C10. The non-transitory computer readable medium of paragraph C8, wherein the spurious fast Fourier transform vectors are filtered based on a predetermined feature of the training data set of fast Fourier transform vectors.

C11. The non-transitory computer readable medium of paragraph C1, wherein the method further comprises filtering, with the processor, fast Fourier transform vectors from the training data set of fast Fourier transform vectors based on the mean and standard deviation of at least one spectral bin of the training data set of fast Fourier transform vectors.

C12. The non-transitory computer readable medium of paragraph C11, wherein the fast Fourier transform vectors with an amplitude greater than the mean+(K*standard deviation) are discarded, where K is a constant.

C13. The non-transitory computer readable medium of paragraph C11, wherein the fast Fourier transform vectors with an amplitude less than the mean−(K*standard deviation) are discarded, where K is a constant.

C14. The non-transitory computer readable medium of paragraph C1, wherein the method further comprises compressing, with the processor, an original number of spectral bins of the training data set of fast Fourier transform vectors to a compressed number of spectral bins so that at least one spectral bin in the compressed number of spectral bins is an average amplitude of a corresponding number of spectral bins in the original number of spectral bins.

C15. The non-transitory computer readable medium of paragraph C1, wherein the method further comprises filtering, with the processor, spurious fast Fourier transform vectors from the one or more fast Fourier transform vectors.

C16. The non-transitory computer readable medium of paragraph C15, wherein the spurious fast Fourier transform vectors are filtered based on a pre-defined statistical norm threshold.

C17. The non-transitory computer readable medium of paragraph C16, wherein the pre-defined statistical norm threshold filters fast Fourier transform data that exceeds a predetermined range of physically feasible values.

C18. The non-transitory computer readable medium of paragraph C15, wherein the method further comprises compressing, with the processor, an original number of spectral bins of the one or more fast Fourier transform vectors to a compressed number of spectral bins so that at least one spectral bin in the compressed number of spectral bins is an average amplitude of a corresponding number of spectral bins in the original number of spectral bins.

C19. The non-transitory computer readable medium of paragraph C1, wherein the method further comprises generating the analysis model with the processor by:

applying dictionary learning to a training data set of fast Fourier transform vectors to create a learned dictionary, the training data set being generated from the plurality of sensor signals obtained under normal operating conditions of the predetermined characteristic, decomposing the one or more fast Fourier transform vectors in the training data set of fast Fourier transform vectors where decomposition of the one or more fast Fourier transform vectors in the training data set of fast Fourier transform vectors represents a low rank portion of the analysis model and a residual of the decomposition represents a sparse portion of the analysis model, reconstructing the one or more fast Fourier transform vectors in the training data set of fast Fourier transform vectors to generate a set of weights for each or at least one of the one or more fast Fourier transform vectors in the training data set of fast Fourier transform vectors, calculating a residual vector for each or at least one fast Fourier transform vector in the training data set of fast Fourier transform vectors, the residual vector representing a difference between a respective fast Fourier transform vector in the training data set of fast Fourier transform vectors and a reconstructed fast Fourier transform vector corresponding to the respective fast Fourier transform vector, and generating a low rank Gaussian model for the low rank portion and a sparse Gaussian model for the sparse portion based on the residual vector for each or at least one fast Fourier transform vector in the training data set of fast Fourier transform vectors.

C20. The non-transitory computer readable medium of paragraph C1, wherein method further comprises determining, with the processor using the analysis model, a degree to which the one or more fast Fourier transform vectors could have been generated by the analysis model by one or more of:

determining a low rank portion of the one or more fast Fourier transform vectors, by decomposing the one or more fast Fourier transform vectors with a learned dictionary of the analysis model, and employing a low rank Gaussian model to determine the degree to which the one or more fast Fourier transform vectors could have been generated by the analysis model; and determining a sparse portion of the one or more fast Fourier transform vectors, by calculating a residual vector that represents a difference between a respective one of the one or more fast Fourier transform vectors and a reconstructed fast Fourier transform corresponding to respective one of the one or more fast Fourier transform vectors, and employing a sparse Gaussian model to determine the degree to which the one or more fast Fourier transform vectors could have been generated by the analysis model.

C21. The non-transitory computer readable medium of paragraph C1, wherein the vehicle is an aerospace vehicle.

C22. The non-transitory computer readable medium of paragraph C1, wherein the vehicle is an airplane.

D1. A method comprising:
obtaining, with a processor onboard a vehicle, a plurality of sensor signals corresponding to a predetermined characteristic of the vehicle from one or more sensors onboard the vehicle;
generating, with the processor, an analysis model for the predetermined characteristic, the analysis model being trained by the processor with a training data set of fast Fourier transform vectors that are generated from the plurality of sensor signals obtained under normal operating conditions of the predetermined characteristic; and
determining, with the processor, a health of a vehicle component corresponding to the predetermined characteristic with the analysis model.

D2. The method of paragraph D1, further comprising:
generating, with the processor, one or more fast Fourier transform vectors based on the plurality of sensor signals so that the one or more fast Fourier transform vectors are representative of the predetermined characteristic; and
wherein the processor determines the health of the vehicle component using the analysis model where the analysis model provides a degree to which the one or more fast Fourier transform vectors could have been generated by the analysis model.

D3. The method of paragraph D1, further comprising communicating, with indicator in communication with the processor, the health of the vehicle component to an operator or crew member of the vehicle.

D4. The method of paragraph D1, where the training data set of fast Fourier transform vectors includes data from the vehicle and at least another vehicle.

D5. The method of paragraph D1, wherein the plurality of sensor signals are obtained, under the normal operating conditions of the predetermined characteristic, over one or more predetermined time periods.

D6. The method of paragraph D5, further comprising generating, with the processor, a time series of fast Fourier transform vectors corresponding to the one or more predetermined time periods, the time series of fast Fourier transform vectors forming the training data set of fast Fourier transform vectors.

D7. The method of paragraph D1, further comprising filtering, with the processor, spurious fast Fourier transform vectors from the training data set of fast Fourier transform vectors.

D8. The method of paragraph D7, wherein the spurious fast Fourier transform vectors are filtered based on a pre-defined statistical norm threshold.

D9. The method of paragraph D8, wherein the pre-defined statistical norm threshold filters fast Fourier transform data that exceeds a predetermined range of physically feasible values.

D10. The method of paragraph D7, wherein the processor is configured to filter the spurious fast Fourier transform vectors based on a predetermined feature of the training data set of fast Fourier transform vectors.

D11. The method of paragraph D1, further comprising filtering, with the processor, fast Fourier transform vectors from the training data set of fast Fourier transform vectors based on the mean and standard deviation of at least one spectral bin of the training data set of fast Fourier transform vectors.

D12. The method of paragraph D11, wherein the fast Fourier transform vectors with an amplitude greater than the mean+(K*standard deviation) are discarded, where K is a constant.

D13. The method of paragraph D11, wherein the fast Fourier transform vectors with an amplitude less than the mean−(K*standard deviation) are discarded, where K is a constant.

D14. The method of paragraph D1, further comprising compressing, with the processor, an original number of spectral bins of the training data set of fast Fourier transform vectors to a compressed number of spectral bins so that at least one spectral bin in the compressed number of spectral bins is an average amplitude of a corresponding number of spectral bins in the original number of spectral bins.

D15. The method of paragraph D1, further comprising filtering, with the processor, spurious fast Fourier transform vectors from the one or more fast Fourier transform vectors.

D16. The method of paragraph D15, wherein the spurious fast Fourier transform vectors are filtered based on a pre-defined statistical norm threshold.

D17. The method of paragraph D16, wherein the pre-defined statistical norm threshold filters fast Fourier transform data that exceeds a predetermined range of physically feasible values.

D18. The method of paragraph D15, further comprising compressing, with the processor, an original number of spectral bins of the one or more fast Fourier transform vectors to a compressed number of spectral bins so that at least one spectral bin in the compressed number of spectral bins is an average amplitude of a corresponding number of spectral bins in the original number of spectral bins.

D19. The method of paragraph D1, further comprising generating the analysis model with the processor by:
applying dictionary learning to a training data set of fast Fourier transform vectors to create a learned dictionary, the training data set being generated from the plurality of sensor signals obtained under normal operating conditions of the predetermined characteristic,
decomposing the one or more fast Fourier transform vectors in the training data set of fast Fourier transform vectors where decomposition of the one or more fast Fourier transform vectors in the training data set of fast Fourier transform vectors represents a low rank portion of the analysis model and a residual of the decomposition represents a sparse portion of the analysis model,
reconstructing the one or more fast Fourier transform vectors in the training data set of fast Fourier transform vectors to generate a set of weights for each or at least one of the one or more fast Fourier transform vectors in the training data set of fast Fourier transform vectors,
calculating a residual vector for each or at least one fast Fourier transform vector in the training data set of fast Fourier transform vectors, the residual vector representing a difference between a respective fast Fourier transform vector in the training data set of fast Fourier transform vectors and a reconstructed fast Fourier transform vector corresponding to the respective fast Fourier transform vector, and
generating a low rank Gaussian model for the low rank portion and a sparse Gaussian model for the sparse portion based on the residual vector for each or at least one fast Fourier transform vector in the training data set of fast Fourier transform vectors.

D20. The method of paragraph D1, further comprising determining, with the processor using the analysis model, a degree to which the one or more fast Fourier transform vectors could have been generated by the analysis model by one or more of:

determining a low rank portion of the one or more fast Fourier transform vectors, by decomposing the one or more fast Fourier transform vectors with a learned dictionary of the analysis model, and employing a low rank Gaussian model to determine the degree to which the one or more fast Fourier transform vectors could have been generated by the analysis model; and determining a sparse portion of the one or more fast Fourier transform vectors, by calculating a residual vector that represents a difference between a respective one of the one or more fast Fourier transform vectors and a reconstructed fast Fourier transform corresponding to respective one of the one or more fast Fourier transform vectors, and employing a sparse Gaussian model to determine the degree to which the one or more fast Fourier transform vectors could have been generated by the analysis model.

D21. The method of paragraph D1, wherein the vehicle is an aerospace vehicle.

D22. The method of paragraph D1, wherein the vehicle is an airplane.

Reference herein to "one example" or "one aspect" means that one or more feature, structure, or characteristic described in connection with the example or aspect is included in at least one implementation. The phrase "one example" or "one aspect" in various places in the specification may or may not be referring to the same example or aspect.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain illustrative combinations of elements and/or functions, it should be appreciated that different combinations of elements and/or functions may be provided by alternative implementations without departing from the scope of the appended claims.

What is claimed is:

1. A fault detection system comprising:
   one or more sensors onboard a vehicle, the one or more sensors being configured to detect a predetermined characteristic of the vehicle and generate a plurality of raw unlabeled sensor signals corresponding to the predetermined characteristic;
   a processor onboard the vehicle, the processor being configured to
   receive the plurality of sensor signals from the one or more sensors,
   generate one or more fast Fourier transform vectors based on the plurality of sensor signals so that the one or more fast Fourier transform vectors are representative of the predetermined characteristic,
   generate an analysis model for the predetermined characteristic from a time history of the fast Fourier transform vectors, where the analysis model is trained by the processor with a training data set of fast Fourier transform vectors that are generated from the plurality of raw unlabeled sensor signals obtained only under normal health data operating conditions of the predetermined characteristic, and
   determine, using the analysis model, a degree to which the one or more fast Fourier transform vectors could have been generated by the analysis model; and
   an indicator in communication with the processor, the indicator being configured to communicate an operational status of the vehicle to an operator or crew member of the vehicle based on the degree to which the one or more fast Fourier transform vectors could have been generated by the analysis model.

2. The fault detection system of claim 1, wherein the plurality of sensor signals obtained only under the normal health data operating conditions of the predetermined characteristic are obtained over one or more predetermined time periods.

3. The fault detection system of claim 2, wherein the processor is configured to generate a time series of fast Fourier transform vectors corresponding to the one or more predetermined time periods, the time series of fast Fourier transform vectors forming the training data set of fast Fourier transform vectors.

4. The fault detection system of claim 1, wherein the training data set of fast Fourier transform vectors is generated from the plurality of sensor signals, the plurality of sensor signals being obtained from the vehicle and at least another vehicle.

5. The fault detection system of claim 1, wherein the processor is configured to filter fast Fourier transform vectors from the training data set of fast Fourier transform vectors based on the mean and standard deviation of at least one spectral bin of the training data set of fast Fourier transform vectors.

6. The fault detection system of claim 1, wherein the processor is configured to compress an original number of spectral bins of the training data set of fast Fourier transform vectors to a compressed number of spectral bins so that at least one spectral bin in the compressed number of spectral bins is an average amplitude of a corresponding number of spectral bins in the original number of spectral bins.

7. The fault detection system of claim 1, wherein the processor is further configured to filter spurious fast Fourier transform vectors from the one or more fast Fourier transform vectors.

8. A method comprising:
   detecting, with one or more sensors onboard a vehicle, a predetermined characteristic of the vehicle and generating, with the one or more sensors, a plurality of sensor signals corresponding to the predetermined characteristic;
   receiving, with a processor onboard the vehicle, the plurality of sensor signals from the one or more sensors,
   generating, with the processor onboard the vehicle, one or more fast Fourier transform vectors based on the plurality of sensor signals so that the one or more fast Fourier transform vectors are representative of the predetermined characteristic,
   generating, with the processor onboard the vehicle, an analysis model for the predetermined characteristic from a time history of the fast Fourier transform vectors, where the analysis model is trained by the processor with a training data set of fast Fourier transform vectors that are generated from the plurality of raw unlabeled sensor signals obtained only under normal health data operating conditions of the predetermined characteristic, and determining, with the processor onboard the vehicle using the analysis model, a degree to which the one or more fast Fourier transform vectors could have been generated by the analysis model; and communicating an operational status of the vehicle to an operator or crew member of the vehicle, with an indictor in communication with the processor, based on the degree to which the one or more fast Fourier transform vectors could have been generated by the analysis model.

9. The fault detection system of claim 1, wherein the processor is further configured to generate the analysis model by:

applying dictionary learning to the training data set of fast Fourier transform vectors to create a learned dictionary, decomposing the one or more fast Fourier transform vectors in the training data set of fast Fourier transform vectors where decomposition of the one or more fast Fourier transform vectors in the training data set of fast Fourier transform vectors represents a low rank portion of the analysis model and a residual of the decomposition represents a sparse portion of the analysis model, reconstructing the one or more fast Fourier transform vectors in the training data set of fast Fourier transform vectors to generate a set of weights for each or at least one of the one or more fast Fourier transform vectors in the training data set of fast Fourier transform vectors, calculating a residual vector for each or at least one fast Fourier transform vector in the training data set of fast Fourier transform vectors, the residual vector representing a difference between the respective fast Fourier transform vector in the training data set of fast Fourier transform vectors and the reconstructed fast Fourier transform vector corresponding to the respective fast Fourier transform vector, and generating a low rank Gaussian model for the low rank portion and a sparse Gaussian model for the sparse portion based on the residual vector for each or at least one fast Fourier transform vector in the training data set of fast Fourier transform vectors.

10. The fault detection system of claim 1, wherein the processor is further configured to determine, using the analysis model, the degree to which the one or more fast Fourier transform vectors could have been generated by the analysis model by one or more of:

determining a low rank portion of the one or more fast Fourier transform vectors, by decomposing the one or more fast Fourier transform vectors with a learned dictionary of the analysis model, and employing a low rank Gaussian model to determine the degree to which the one or more fast Fourier transform vectors could have been generated by the analysis model; and determining a sparse portion of the one or more fast Fourier transform vectors, by calculating a residual vector that represents a difference between a respective one of the one or more fast Fourier transform vectors and a reconstructed fast Fourier transform corresponding to respective one of the one or more fast Fourier transform vectors, and employing a sparse Gaussian model to determine the degree to which the one or more fast Fourier transform vectors could have been generated by the analysis model.

11. The fault detection system of claim 1, wherein the vehicle is an aerospace vehicle.

12. The fault detection system of claim 1, wherein the vehicle is an airplane.

13. The fault detection system of claim 8, wherein the processor is further configured to compress an original number of spectral bins of the one or more fast Fourier transform vectors to a compressed number of spectral bins so that at least one spectral bin in the compressed number of spectral bins is an average amplitude of a corresponding number of spectral bins in the original number of spectral bins.

14. The method of claim 13, wherein the plurality of sensor signals obtained only under the normal health data operating conditions of the predetermined characteristic are obtained over one or more predetermined time periods.

15. The method of claim 14, wherein the processor is configured to generate a time series of fast Fourier transform vectors corresponding to the one or more predetermined time periods, the time series of fast Fourier transform vectors forming the training data set of fast Fourier transform vectors.

16. The method of claim 13, wherein the training data set of fast Fourier transform vectors is generated from the plurality of sensor signals, the plurality of sensor signals being obtained from the vehicle and at least another vehicle.

17. The method of claim 13, wherein the processor is configured to filter fast Fourier transform vectors from the training data set of fast Fourier transform vectors based on the mean and standard deviation of at least one spectral bin of the training data set of fast Fourier transform vectors.

18. The method of claim 13, wherein the processor is configured to compress an original number of spectral bins of the training data set of fast Fourier transform vectors to a compressed number of spectral bins so that at least one spectral bin in the compressed number of spectral bins is an average amplitude of a corresponding number of spectral bins in the original number of spectral bins.

19. The fault detection system of claim 1, wherein the processor is further configured to filter spurious fast Fourier transform vectors from the training data set of fast Fourier transform vectors.

20. The fault detection system of claim 19, wherein the processor is configured to filter the spurious fast Fourier transform vectors from the training data set of Fast Fourier transform vectors based on a pre-defined statistical norm threshold.

* * * * *